United States Patent [19]

Caputo et al.

[11] Patent Number: 5,778,071
[45] Date of Patent: Jul. 7, 1998

[54] POCKET ENCRYPTING AND AUTHENTICATING COMMUNICATIONS DEVICE

[75] Inventors: Anthony A. Caputo, West Chester, Pa.; Victor P. Amoruso, Cumberland, Md.

[73] Assignee: Information Resource Engineering, Inc., Baltimore, Md.

[21] Appl. No.: 689,726

[22] Filed: Aug. 12, 1996

Related U.S. Application Data

[63] Continuation-in-part of Ser. No. 273,764, Jul. 12, 1994, Pat. No. 5,546,463.

[51] Int. Cl.[6] .............................. H04L 9/32; H04L 9/00
[52] U.S. Cl. .......................... 380/25; 380/9; 380/23; 380/30; 380/49; 380/52; 375/220; 375/222
[58] Field of Search .......................... 380/4, 9, 23, 24, 380/25, 28, 29, 30, 49, 50, 52, 53, 59; 235/379, 380; 340/825.31, 825.34

[56] References Cited

U.S. PATENT DOCUMENTS

| | | | |
|---|---|---|---|
| 4,068,089 | 1/1978 | Kuhnlein et al. | 380/52 |
| 4,095,046 | 6/1978 | Frutiger et al. | 380/52 X |
| 4,229,817 | 10/1980 | Morgan et al. | 380/52 |
| 4,646,305 | 2/1987 | Tretter et al. | |
| 4,924,516 | 5/1990 | Bremer et al. | |
| 5,131,025 | 7/1992 | Hamasaki | |
| 5,224,166 | 6/1993 | Hartman, Jr. | |

*Primary Examiner*—Bernarr E. Gregory
*Attorney, Agent, or Firm*—Hoffmann & Baron, LLP

[57] ABSTRACT

A portable security device is disclosed which can be carried by an individual and connected directly to telephone circuits to both authenticate that individual and encrypt data communications. The invention can operate as an electronic "token" to uniquely identify the user to a network, to a computer system or to an application program. The "token" contains the complete network interface, such as a modem, which modulates the data and provides the circuitry required for direct connection to the network. Furthermore, this "token" will preferably not permit communications to proceed until the device, and optionally the user, have been identified by the proper authentication. The token also contains all of the cryptographic processing required to protect the data using data encryption or message authentication or digital signatures or any combination thereof. Thus, the present invention provides the user with all of the communications and security equipment needed for use with personal computers and electronic notebooks and eliminates the need for any other security measures and/or devices.

22 Claims, 14 Drawing Sheets

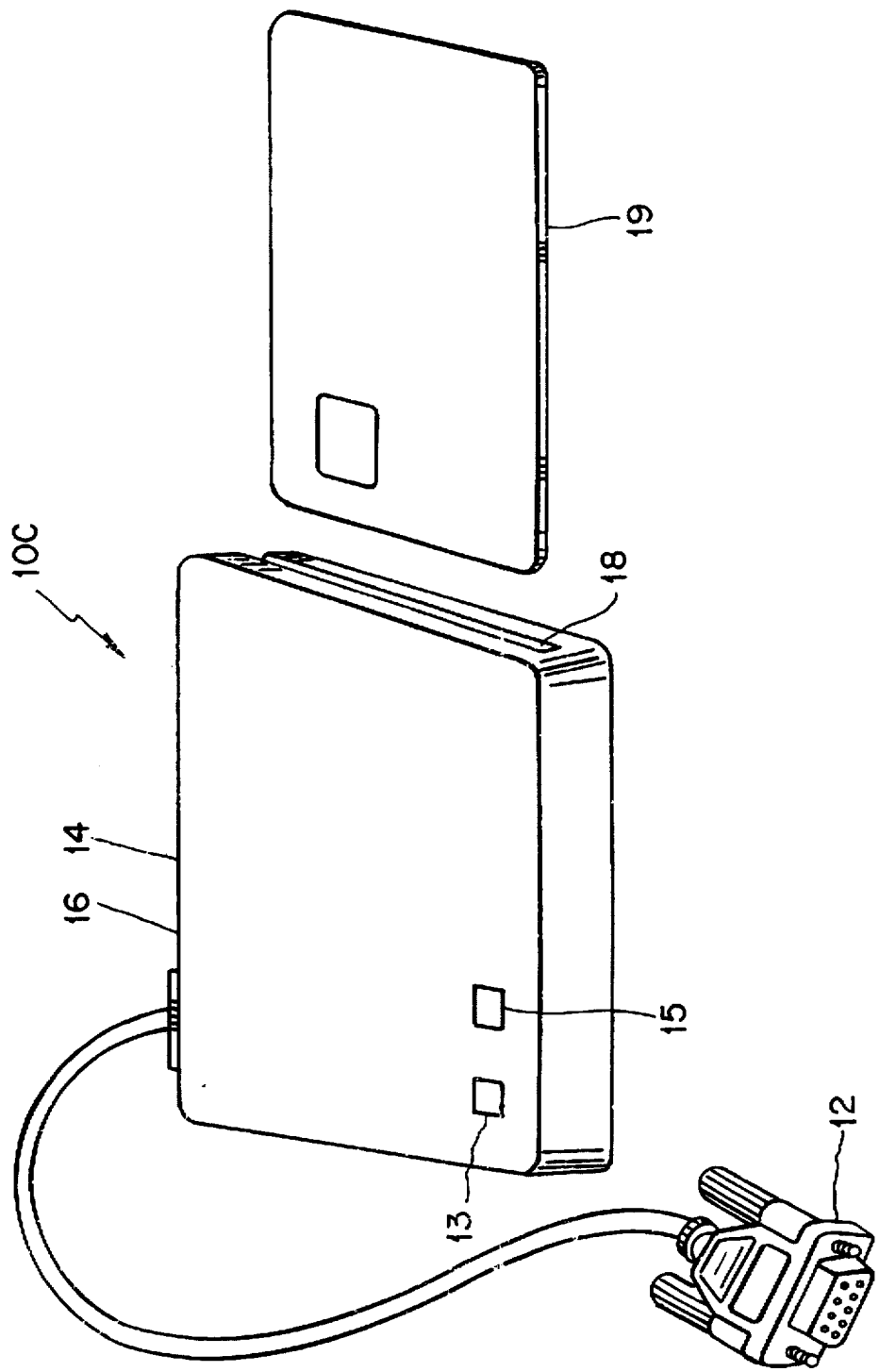

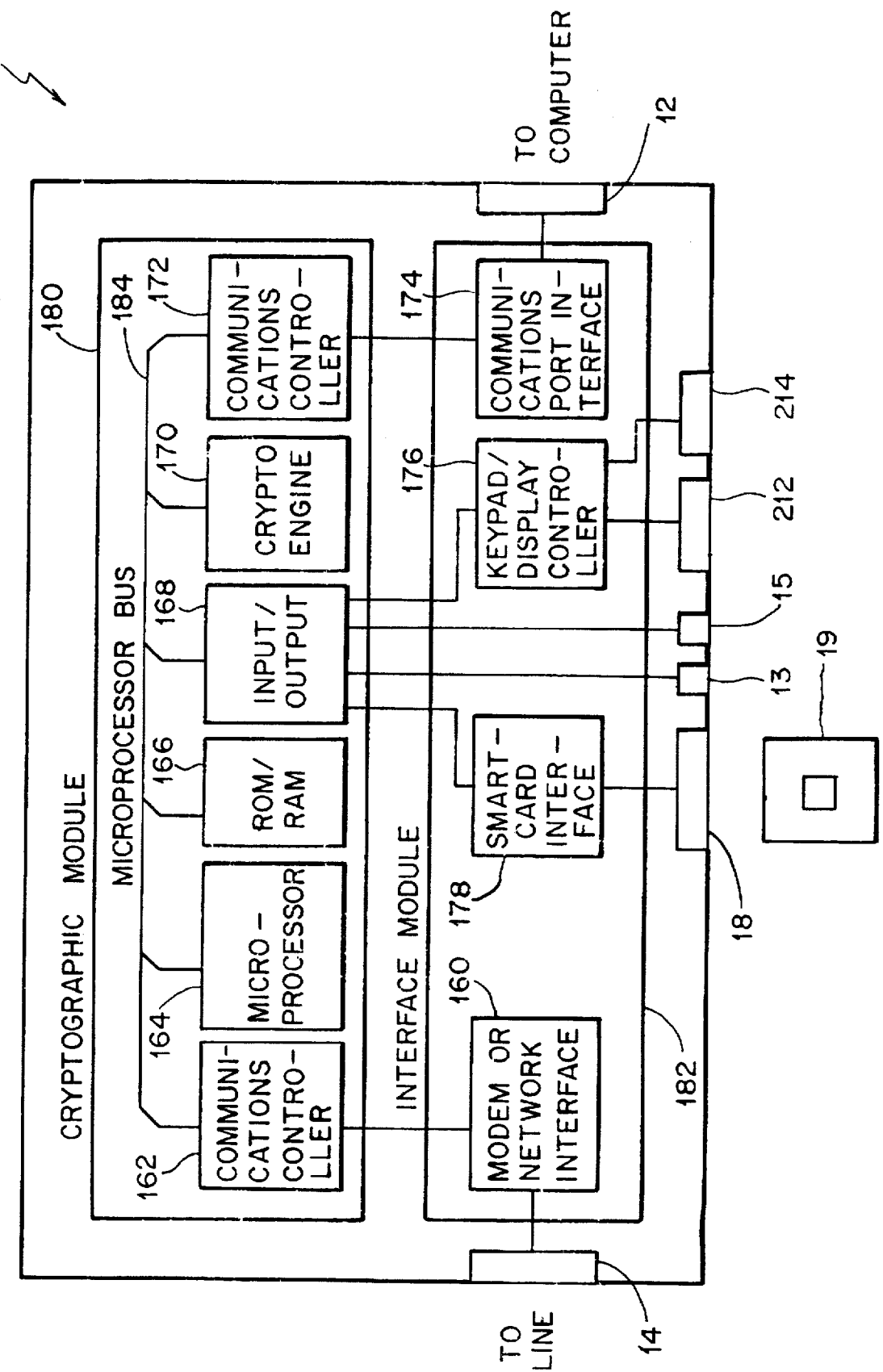

POCKET ENCRYPTING AND AUTHENTICATING COMMUNICATIONS DEVICE

This application is a continuation-in-part of application Ser. No. 08/273,764, filed on Jul. 12 1994, now U.S. Pat. No. 5,546,463.

BACKGROUND OF THE INVENTION

This invention relates to a complete and transportable security device having a network communications interface which provides encryption and authentication capabilities to protect data and restrict access to authorized users. The device can be carried by the user in a pocket or a purse.

The rapid growth in the use of distributed computing has caused a vast increase in the transmission of sensitive and vulnerable data on computer networks. This increase in private data on communications lines has opened network computing to substantial risk. These risks include the ability for unauthorized persons to gain access to networks or computers and for eavesdroppers to read proprietary data on the communications line. At the same time, there is an increased need for communications equipment to be compact and convenient so that it can be used with laptop computers and other personal computing equipment.

"Data encryption" is herein defined as a technique to protect the confidentiality of data to ensure that it is not disclosed or revealed to unauthorized persons. "Device authentication" is herein defined as a technique to identify and control access to a network or system by a specific device or "token." "User authentication" is herein defined as being similar to device authentication except that the user is identified instead of a device. "Message authentication" is herein defined as a technique which safeguards against the undetected modification of data in transit or the counterfeiting of data. Each of the aforementioned techniques can be based on either secret key (symmetric key) or public key cryptography. The capability to perform this cryptography is herein referred simply to as "encryption."

Data encryption has been used in the past as described in U.S. Pat. No. 3,962,539 to Ehrsam. Data authentication, which has been used in the past by banking and other financial industries, is a technique to detect any modification of communicated data.

The idea of authentication of the user by something the user possesses, such as a smartcard, or something the user knows such as a personal identification number (PIN) or a biological attribute of the user such as a fingerprint, is known in the art. These methods have not, however, provided a complete communications security system to be carried by the user.

U.S. Pat. No. 4,546,213 describes a modem security device, but the device does not provide efficient encryption and authentication capabilities nor can it be carried as a "token" to control access to a computer network. Several methods of "authenticating" the user using "biological" attributes, such as fingerprint readers, retina (eye) scanners are known. For example, U.S. Pat. No. 5,153,918 describes a security system for data communications for securing access to a computer system using voice recognition as the access control medium. Similarly, Young and Hammon in U.S. Pat. No. 4,805,222 describe the use of operator keystroke dynamics to identify the user. Unfortunately, these methods have proven to be expensive for ordinary commercial use and have been considered to be inconvenient or intrusive by potential users.

Lessin, U.S. Pat. No. 4,868,376, incorporates a means of authenticating a user with a personal identification number (PIN). The Lessin security device is contained in a portable housing, such as a smartcard, but requires connection to a non-portable reader and does not include means for direct connection with a telephone network. U.S. Pat. No. 5,301, 234 describes a radiotelephone installation for prepayment operation with security protection using encryption to authenticate the device, but the '234 patent discloses use of the device in conjunction with payment of services for radiotelephone sets—not digital communications security with data encryption. U.S. Pat. No. 5,239,294 describes a means of authenticating a subscriber's device to control access to cellular telecommunications networks, but is specifically directed to use with radio telecommunication systems.

It is, therefore, an object of the present invention to overcome shortcomings associated with prior art systems and devices. These objects will be made known to those skilled in the art from the following description.

SUMMARY OF THE INVENTION

The present invention is a transportable encrypting and authenticating communications device which preferably includes encrypting means for encrypting and decrypting data received by the device, authenticating means for authenticating the device and use of the device by a user, network interfacing means for transmitting the data and for receiving the data over a data transfer path (i.e., communications network, for instance, a telephone line) and computer processing means for establishing a secure communications link between a computer system of a user and a remote computer system by controlling the operation of the encrypting, authenticating and network interfacing means of the present invention. It is to be appreciated that the encrypting means under control of the computer processing means may be alternately referred to hereinafter as an encryptor, while the authenticating means under control of the computer processing means may be referred to as an authenticator. Similarly, the network interfacing means under control of the computer processing means may be referred to as a network interface or modem. Accordingly, the encryptor, authenticator, and modem can be co-located in a compact housing whereby the device can be conveniently transported on the person of the user in a discrete manner, such as in the pocket or purse of the user.

Furthermore, the device includes at least one port for connection to a data transfer path and at least one port for connection to a computer communications port. It is to be appreciated that the computer communications port may be any connector standard which is compatible with the user's computer system and, in one particular embodiment as will be described herein, may be a PCMCIA (Personal Computer Memory Card International Association) connector.

The authenticator is preferably a cryptographic means which identifies the authorized user by an authorized user identification such as a message authentication code or digital signature. The encryptor is preferably a means for encrypting data transmitted or received by the user.

It is to be appreciated, as will be explained later, that the device of the present invention may be employed for establishing secure communications across communications networks of varying protocols and standards. For instance, the network interfacing means may preferably provide a data interface for data transmission over an Integrated Services Digital Network (ISDN) type communications network.

Alternately, the network interfacing means may provide a local area network (LAN) compatible data interface.

The portable encryption and authentication communications device preferably employs the use of a keypad mounted on the housing to enter a personal identification number (PIN). The authenticator can also be operated by the insertion of a smartcard which contains a PIN or code which uniquely identifies the user.

Further, the portable encryption and authentication communications device of the present invention may also include a display which prompts the user to enter a PIN at the keypad or to insert a smartcard and which may provide a means for displaying appropriate system status indicators to the user.

Still further, the device of the present invention may include first and second indicators, preferably in the form of light emitting diodes, which provide the user of the device with system status indications.

Preferably, the compact encryption and authentication communications device includes means of detecting the modification of messages sent or received by message authentication codes or digital signatures.

Also, preferably, the keys used for encryption and the keys used for authentication may be changed from a remotely located key management center or by another authorized encryption device.

As a result of the present invention, an entire security communications device is provided which operates as a token to electronically identify a user, especially in conjunction with the use of a PIN (preferably entered via a keypad or a smartcard) to prevent use by others.

The present invention is a device which incorporates the use of encryption and authentication techniques uniquely with a communications interface device, such as a modem. The device is portable and can replace an entry means (such as a token) to identify the user and protect communication from unwanted eavesdropping.

As a result of the present invention, architecture has been provided to advance the art significantly by the integration of security and interface functions in a single portable device which can be used as an access control means to another computer or network.

These advantages have been met by incorporating into a portable-sized housing the combination of a highly secure message encryptor and authenticator. This device serves as an entry token which can be assigned to an individual and easily transported by that person in a pocket or purse and uniquely identifies that person to another such cryptographic device.

As a result of the present invention, separate physical components have been eliminated as well as cabling, and other hardware associated with cryptographic communications equipment. Consequently, the complete communications security protection can be provided for portable computers such as laptops and notebook computers.

Furthermore, as a result of the present invention, the operation and setup of otherwise complex and sophisticated equipment is simplified significantly. This has been done by eliminating configuration and cabling requirements and adjustments usually associated with discrete modem, encryptor, and authenticator components.

Moreover, as a result of the architecture provided herein, communications must be passed through the proper cryptographic protection in order to provide access to the user. Moreover, protection cannot be defeated either through accidently bypassing connections to the encryptor or by mere neglect. Furthermore, the compact encryption and authentication device of the present invention can be employed with computer systems without the need for modifying existing software applications operating on the computer systems.

Other and further objects and advantages of the present invention will be realized by those skilled in the art upon consideration of the following description taken together with the drawings, and the scope of the invention will be set forth in the appended claims.

BRIEF DESCRIPTION OF THE DRAWINGS

Preferred embodiments of the invention have been chosen for purposes of illustration and description, but are not intended in any way to restrict the scope of the present invention. The preferred embodiments of certain aspects of the invention are shown in the accompanying drawings, wherein:

FIG. 1C is a perspective view of another form of an encrypting/authenticating communications device formed in accordance with the present invention;

FIG. 2 is a block diagram of one embodiment of the present invention depicting operational cooperation of functional components;

DETAILED DESCRIPTION OF THE INVENTION

The present invention is a portable device which can be used as an identifying token, a communications network interface, a data encryptor, and a user, device and/or message authenticator. It provides an electronic token which can be carried by the user to uniquely identify him or her to a network, to a computer system or to an application program. The device contains the modem which modulates the data in such a way that it can be directly connected to a data transfer path, such as a telephone network. The device will not permit communications to proceed until such device and, optionally, the user, have been identified by the authenticator. The device also contains all of the cryptography required to protect the data using data encryption or message authentication or digital signatures or any combination thereof. Thus, the present invention provides the user with all of the communications and security equipment needed for use with personal computers and electronic notebooks and eliminates the need for any other security apparatus. The device is a complete service interface/security device which makes complete communications security practical when used with portable computing equipment.

Although the description which follows contains many specifics, these should not be construed as limiting the scope of the invention but merely illustrate some of the many possible variations and/or embodiments of the present invention. For example, the modem (i.e., network interface or adaptor) may be connected to a Local Area Network (LAN) in place of a telephone system. In addition, various modulation techniques including, for example, those associated with an Integrated Services Digital Network (ISDN) or an Asymmetrical Digital Subscriber Line (ADSL), may be employed in the present invention in order that the device may be utilized with systems employing such communication and/or data transfer standards. Furthermore, it should be appreciated that the data transferred therethrough may include various message forms such as, for example, text, video images and/or digitized audio.

Figure 1A:
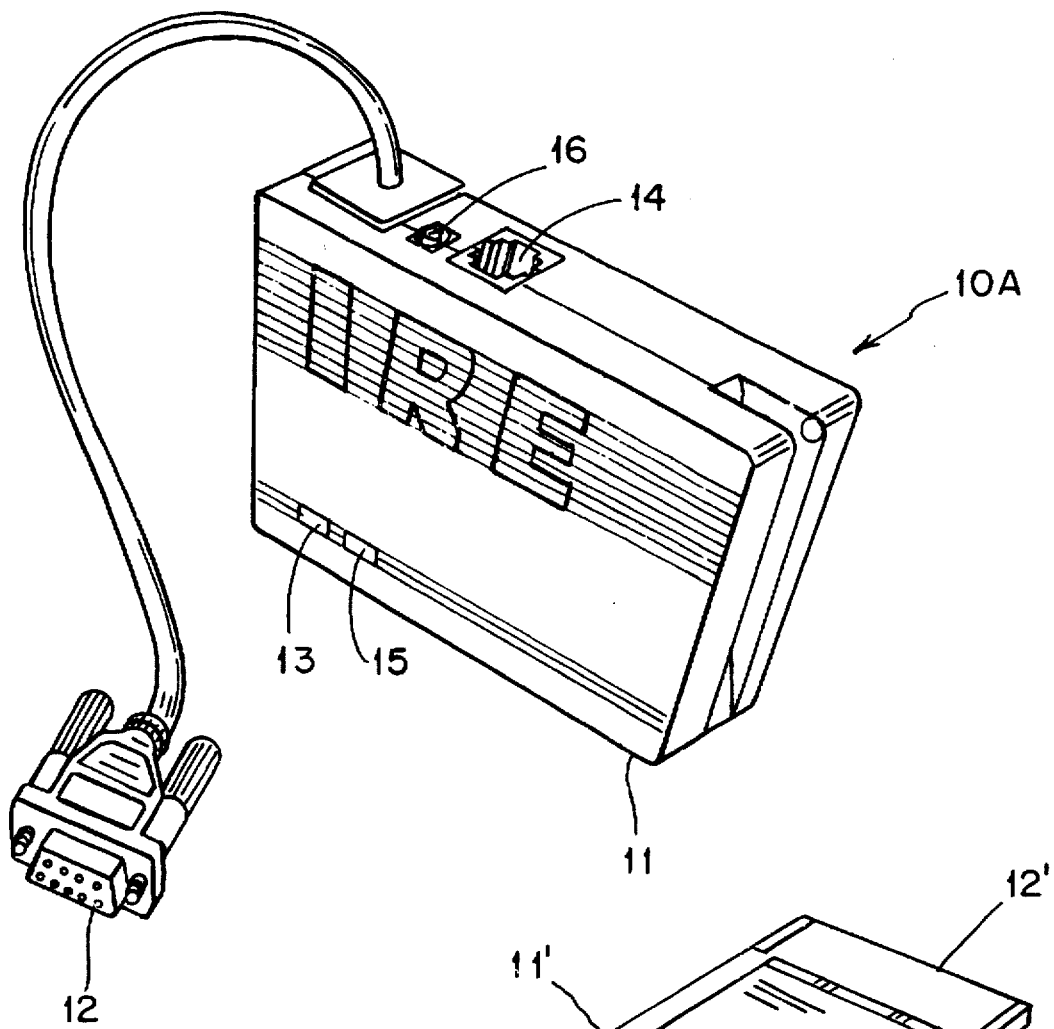
FIG. 1A is a perspective view of a compact encrypting/authenticating communications device formed in accordance with the present invention.

Referring initially to FIG. 1A, the encrypting/authenticating communications device 10A is depicted in a single housing 11 of convenient size. It is to be understood that all of the functions of encrypting, authenticating and network interfacing are performed by the device of the present invention by way of the components contained therein or associated therewith. Furthermore, the present invention may be physically protected from unauthorized tampering. By way of example, it is possible to use a potting compound having solvents which cause damage to electronic components thus making the device inoperable if unauthorized tampering is attempted.

The device 10A preferably includes a connector port 12, a connector port 14, a connector port 16, a first indicator 13 and a second indicator 15 mounted on the housing 11. The connector port 12 includes a connector and a cable for direct connection to a computer port of a personal computer or terminal. Further, the connector port 14 is a modular receptacle which may be directly connected to a data transfer path, such as a telephone system.

It is to be appreciated that the selection of a power source to power the present invention will depend upon the nature of the user's environment. It is to be appreciated that power to operate the device can be supplied by any of several sources. By way of example, but not to be construed as limited the redo methods of providing power to the device 10A may include: a battery, an external power supply module, connection to the keyboard of the user's computer, connection to other ports of the user's computer, or else power drawn from the communications circuits. If the present invention is powered via certain external sources, the third connector port 16 may preferably be included on the housing to permit electrical connection between the device 10 and the particular external power source.

Still further, device 10A includes first and second indicators, 13 and 15, mounted on housing 11. First and second indicators, 13 and 15, may preferably be light emitting diodes (LEDs) which provide an indication to the user of the operating status of the present invention. For example, the first indicator 13 may preferably be a red LED which illuminates when device 10A is transferring data in a non-secure (i.e., non-encrypted) mode, while the second indicator 15 may preferably be a green LED which illuminates when the device is transferring data in a secure (i.e., encrypted) mode.

It is to be understood that, while the present invention uniquely operates as an encryptor, an authenticator and a network interface (functions that will be described in greater detail later), the physical manifestation of the present invention may vary to suit the need of the particular application the device is being used in. Accordingly, it should be appreciated that, while there are various alternative and exemplary physical embodiments described herein, each device is capable of uniquely performing the encryption, authentication and network interfacing functions also described herein regardless of its physical manifestation. Accordingly, for example, it should be appreciated that the form of the connector port 14 may differ from that illustrated in FIG. 1A depending upon the particular communications interface to which the present invention is being interfaced. Likewise, as will be seen below, the connector port 12 may also vary depending on the type of computer or terminal to which the present invention is connected.

Figure 1B:
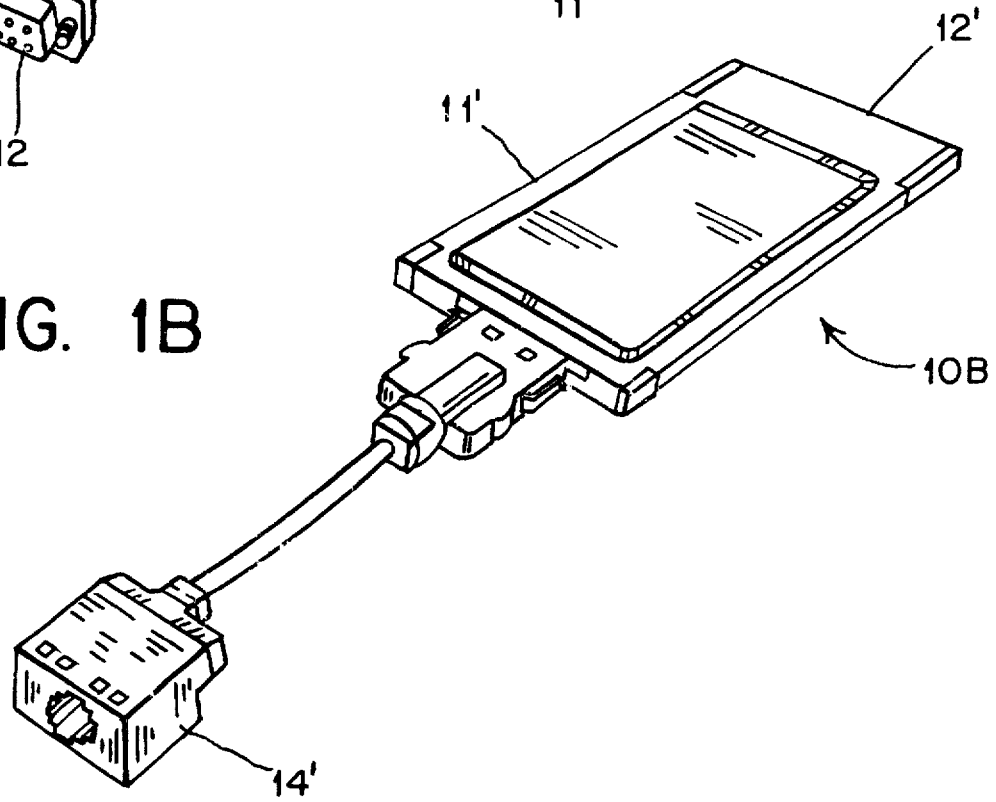
FIG. 1B is a perspective view of a card-sized embodiment of an encrypting/authenticating communications device formed in accordance with the present invention.

Referring now to FIG. 1B, an alternative embodiment of the device of the present invention, denoted as device 103B, is illustrated. In this particular embodiment of the present invention, the physical manifestation includes a card-sized housing 11', similar in length and width to a credit card. Device 10B preferably includes connector ports 12' and 14'. Connector port 12' is a standard female receptacle known to the art as a PCMCIA connector which can be directly connected to any computer with a corresponding PCMCIA mating connector. It should be understood that the PCMCIA is an electronic industry-standard connector protocol and, therefore, such protocol will not be described herein. Furthermore, connector port 14' includes a modular receptacle and cable for direct connection to a telephone system similar to connector 14 illustrated in FIG. 1A. Device 101B may be attached to a computer system (e.g. a laptop or notebook computer) or terminal via connector port 12' by inserting the housing 11' directly into the mating PCMCIA connector slot located on the computer or terminal. As previously stated, such an insertion/connection method employing PCMCIA connectors is known in the art.

FIG. 1C depicts yet another physical manifestation of the present invention. Particularly, a device 10C includes a connector port 12, a connector port 14, a connector port 16 and first and second indicators, 13 and 15, similar to those components described with regard to device 10A illustrated in FIG. 1A. However, device 10C also includes an interface for a smartcard. It is to be appreciated that a "smartcard" is an electronic industry-standard term for an integrated circuit card having the shape and general size of a credit card which may contain both memory storage and/or processing circuitry capable of performing varied functions depending on the application for which it is designed and in which it is employed. Accordingly, since most industry-standard smartcards may be utilized with the present invention to provide the functionality to be described herein, the particular design of the smartcard utilized in accordance with the present invention is not critical. Therefore, a smartcard 19 may interface with device 10C when inserted into receptacle 18. As will be fully described below in the context of the operation of the present invention, the smartcard 19 cooperatively functions with device 10C to provide the novel encrypting/authenticating features of the present invention. For example, the smartcard may be used to: enter the personal identification number (PIN) of the user; authenticate a user; change encryption algorithms used by the device and/or generally to configure the device.

Figure 1D:
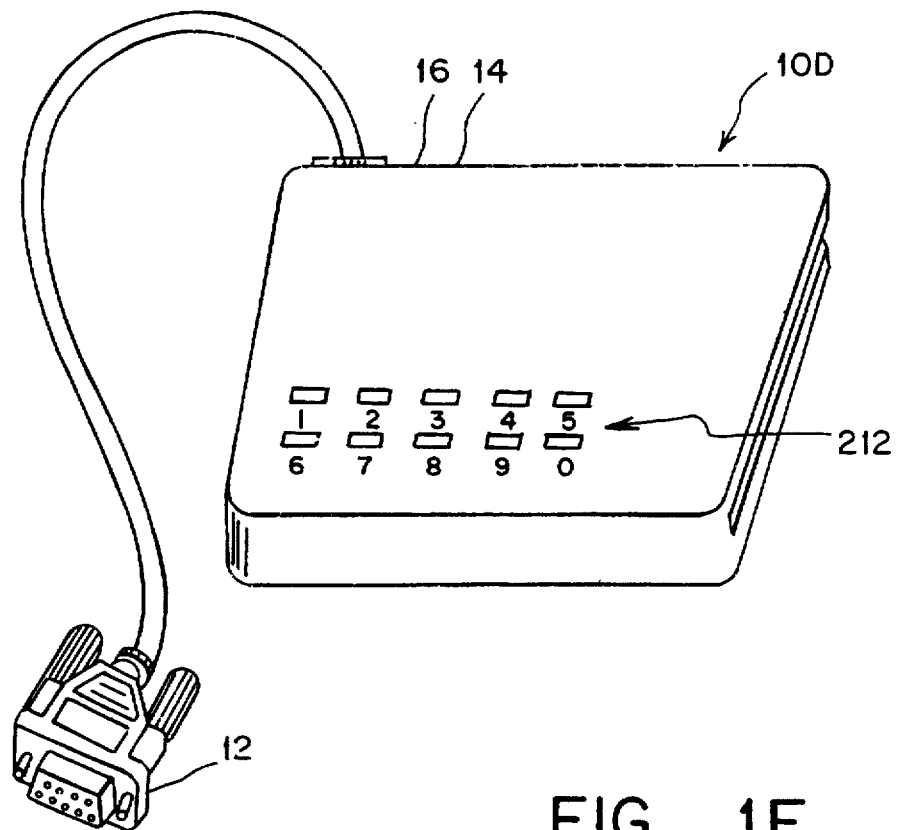
FIG. 1D is a perspective view of yet another form of an encrypting/authenticating communications device formed in accordance with the present invention.

Referring now to FIG. 1D, yet another physical manifestation of the present invention is depicted therein as device 10D. It should be appreciated that while device 10D may include similar connections and components as those described with respect to device 10A (FIG. 1 A) or device 10C (FIG. 1C), device 10D additionally includes a keypad 212. Keypad 212 interfaces with the other components of the present invention, as will be described in detail later, in such a manner as to permit the user to enter a PIN or some other numerical data during authentication and/or encryption operations. If a smartcard interface is also provided, then a user may enter a PIN either by use of the keypad 212 or by inserting the smartcard. Furthermore, while keypad 212 is illustrated in FIG. 1D as including numerically labeled keys, the present invention also contemplates the use of alphanumerically labeled keys.

Figure 1E:
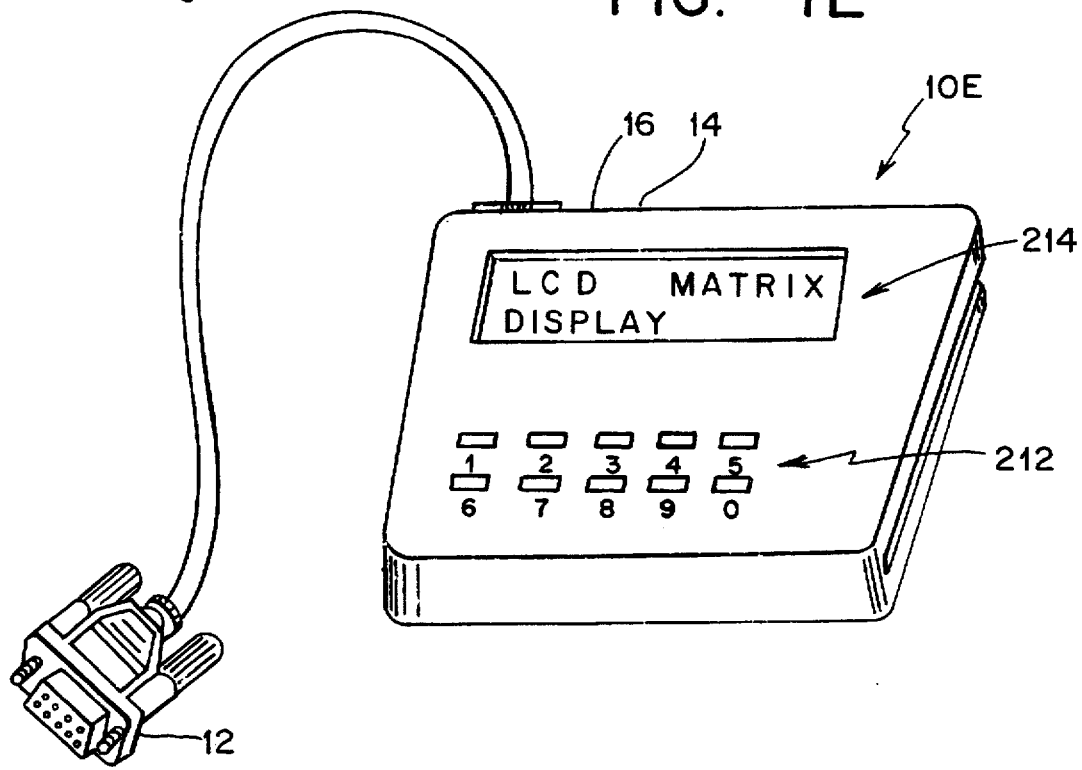
FIG. 1E is a perspective view of still a further form of an encrypting/authenticating communications device formed in accordance with the present invention.

FIG. 1E illustrates still a further physical manifestation of the present invention wherein a device 10E is depicted. It is to be appreciated that device 10E may be similar in configuration to device 10D (FIG. 1D); however, device 10E further includes a display 214. Display 214 may preferably be a liquid crystal display matrix and may interface with the other components of the present invention, as will be described in detail later, in such a manner as to provide a visual prompt to the user to enter his or her PIN or other applicable code number via use of the key pad 212 or a smartcard. In order to ensure privacy, the PIN or code number entered by the user will preferably not be displayed on display 214. In addition, display 214 may provide device status information, for example, similar status indication as provided by the first and second indicators, 13 and 15 (FIG. 1A), if such indicators are not optionally included as part of the device configuration. It should be appreciated that while keypad 212 and display 214 are illustrated as being an integral part of the device housing, such keypad 212 and display 214 may be electrically connected to the device via integral connectors (not shown), similar to connector port 12, yet may be physically located external to the device. Accordingly, the user may selectively connect the peripheral units to the device, when necessary for a particular application.

Figure 1F:
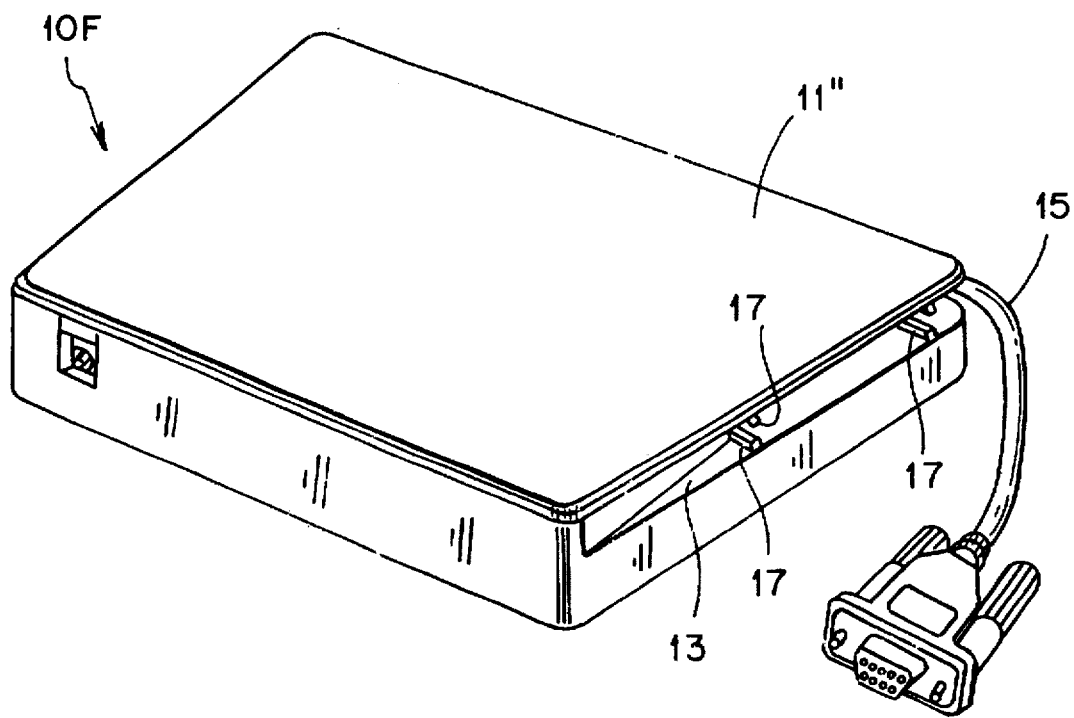
FIGS. 1F and 1G are perspective views which depict yet another feature of the present invention relating to portable characteristics of the housing.
Figure 1G:
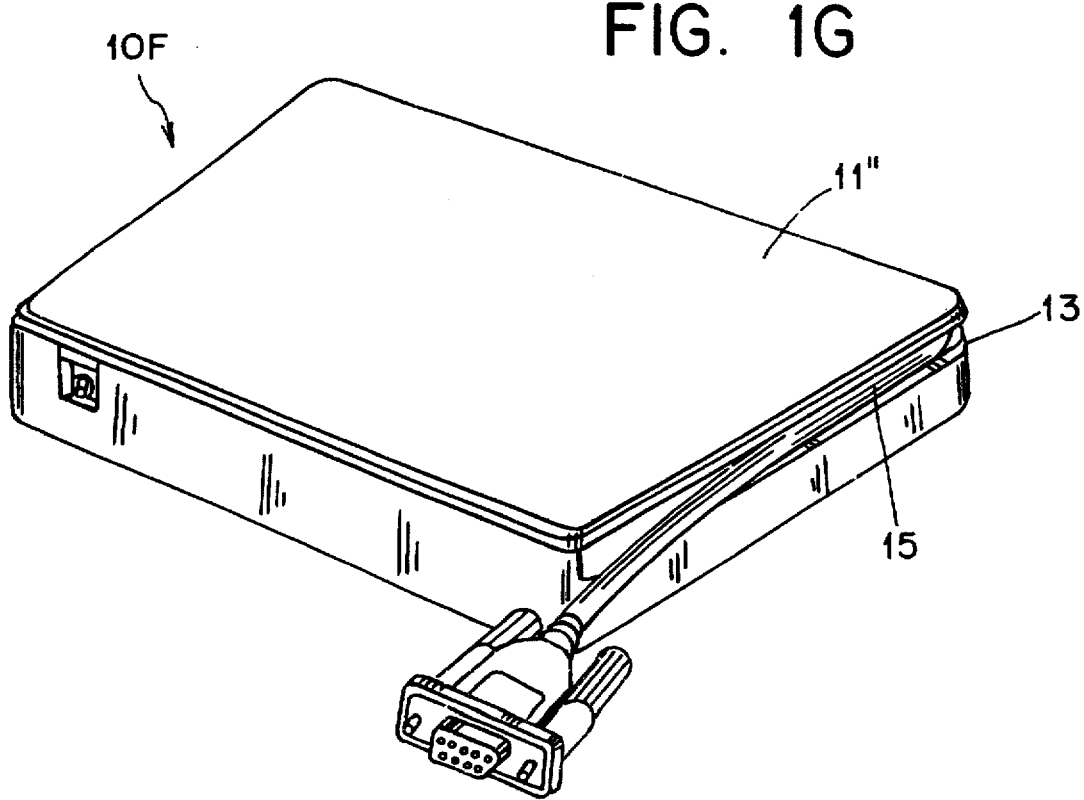

Referring now to FIGS. 1F and 1G, yet another feature of the present invention is shown which enhances its portability and compactness. In particular, a encrypting/authenticating communications device 10F is shown wherein the housing 11" includes an elongated slot 13 which is provided to accommodate a cable 15 attached to the device to implement the required connections (e.g., connector port 12). The slot preferably includes a plurality of projecting ribs 17, which are sized to releasably engage cable 15 when such cable is pressed therebetween. It should be appreciated that the projecting ribs may be replaced with other forms of projections (e.g., semi-circular projections). Moreover, the elongated slot 13 can be provided on one or more sides of the housing 10F. When it is provided on two sides of the housing, the cable 15 can be fed into the slot 13 and wrapped continuously around the housing as depicted in FIG. 1G. Another embodiment includes a deeper slot 13 which would accommodate at least a double fold of cable 15 so that it could be extended and returned on a single side of the housing. Those skilled in the art will be best equipped to design the slot 13 to accommodate the intended use.

Referring now to FIG. 2, a functional block diagram of the present invention is illustrated. Specifically, it is to be appreciated that the functional block diagram illustrated in FIG. 2 depicts the major functional components that may cooperatively operate to form the present invention. It should also be appreciated that, while the actual physical embodiments of the present invention, as exemplified in FIGS. 1A through 1G, may include various combinations of the functional components depicted in FIG. 2, selectively including or excluding certain components depending on the particular design criteria or application, FIG. 2 illustrates the major functional components, in total, in order to simplify the discussion of their cooperative interaction with one another. It is, therefore, to be appreciated that a device formed in accordance with the present invention may preferably include all of the functional components depicted in FIG. 2 and therefore such device will be referred to hereinafter simply as device 10.

Furthermore, the block diagram illustrated in FIG. 2 is not necessarily descriptive of the physical circuit components of the present invention because many of the functions can be integrated into common physical packages. For example, the communications port interface 174 and/or the communications controller 172 may be an integral part of the microprocessor 164. Similarly, the function of the crypto engine 170 may be performed by the firmware of the microprocessor 164 and its associated memory (i.e., ROM/RAM 166) and, therefore, not actually implemented as a separate integrated circuit chip. However, it is within the scope of the present invention to include a device 10 which is preferably designed to have two discrete circuit cards, the first circuit card providing the functions of a cryptographic module 180 and the second circuit card providing the functions of an interface module 182. It should be appreciated that the cryptographic module 180, and its related components, provide the functions of the encryptor and authenticator of the present invention, while portions of the interface module 182, particularly the network interface 160, provide the functions of the communications network interface (e.g., modem) of the present invention.

Accordingly, the pocket encrypting and authenticating communications device 10 of the present invention preferably includes the cryptographic module 180 and the interface module 182. The cryptographic module 180 preferably includes a communications controller 162, a microprocessor 164, system memory in the form of ROM/RAM module 166, an input/output module 168, a crypto engine 170 and a communications controller 172. Furthermore, the above-named components of the cryptographic module 180 are operatively coupled via a microprocessor bus 184. It is to be understood that the microprocessor bus 184 may be similar to a standard microprocessor bus having data, address and control signals for performing data transfer among the functional components of the cryptographic module 180. Thus, in the functional descriptions to follow, overall data flow will be described rather than the individual bus signals whose generation, status and manipulation may be readily appreciated by one skilled in the art.

The interface module 182 preferably includes a modem or network interface module 160, a smartcard interface 178, a keypad/display controller 176 and a communications port interface 174. Also illustrated in the block diagram of FIG. 2 is connector port 12, connector port 14, smartcard receptacle 18, first and second indicators, 13 and 15, keypad 212 and display 214. Specifically, connector port 14 is operatively coupled to network interface 160 which is, itself, operatively coupled to communications controller 162. Also, operatively coupled to input/output module 168 is smartcard interface 178, first and second indicators, 13 and 15, and keypad/display controller 176. The smartcard interface 178 is operatively coupled to the smartcard receptacle 18, while the keypad/display controller 176 is respectively operatively coupled to the keypad 212 and display 214. Further, the communications port interface 174 is operatively coupled to connector port 12 and to communications controller 172. Connector port 16 (i.e., power source connection) is not illustrated in FIG. 2; however, it is to be understood that power provided through such connection may be routed to the physical components of the present invention as needed.

It is to be understood that microprocessor 164, in conjunction with system memory 166, executes the particular computer application program (i.e., system software) which controls the encryption, authentication and network interfacing functions of the present invention. One skilled in the art would be able to realize a multitude of applications programs involving the encryption, authentication and network interfacing given the novel operative cooperation and functionality associated with the present invention. Accordingly, no specific software program is disclosed herein; rather, several examples of data flow are described in order to illustrate the cooperation of the components of device 10. Also, it should be appreciated that the crypto engine 170, under control of microprocessor 164, may perform the encryption and authentication functions (i.e., algorythms) described herein and may be in the form of hardware (i.e., a set of commercially available encryption chips), software or a combination thereof By way of example, a user may connect device 11 to a computer system or terminal via connector port 12 and to a network via connector port 14. Accordingly, data entered at the computer is passed to the communications port interface 174 through connector port 12. Communications port interface 174 buffers data before transferring the data to communications controller 172. It is to be appreciated that communications controller 172 may preferably be a serial communications controller (SCC) and serves to format the serial data into parallel form in order that it may be placed on the microprocessor bus 184. If in an alternative embodiment, the data received at connector port 12 were already in a parallel format, than communications controller 172 would still serve the function of providing the proper timing and control signals necessary to place the data on the microprocessor bus 184.

Microprocessor 164, in conjunction with system memory 166, receives the data and, assuming the data is to be encrypted, transfers data to crypto engine 170. Crypto engine 170, in turn, encrypts data and, if required, performs message, user and/or device authentication functions. Next, microprocessor 164, in conjunction with system memory 166, receives the encrypted data back and then transfers the data to communications controller 162. Communications controller 162 may also preferably be a serial communications controller and may be part of the same controller chip as communications controller 172. Thus, communications controller 162 serves to reformat encrypted data from parallel to serial form and then transfers said data to the modem or network interface 160 which serves to further format the data into the form required to communicate over the particular network (e.g., ISDN) to which the present invention is connected. It is to be appreciated that data flow in the reverse direction, i.e., from the network through device 10 and to the computer, is essentially similar to the data flow described above except in reverse order. However, encrypted data is presented to the crypto engine 170 for decrypting, if desired, before passing to the computer to which device 10 is connected.

Furthermore, as previously mentioned, the smartcard 19 may be inserted into smartcard receptacle 18 and may be used to provide entry of the device user's PIN or may, itself, contain an encryption algorithm to alternatively serve the cryptographic functions otherwise performed by crypto engine 170. When utilized, the smartcard communicates with the device through smartcard interface 178 which buffers and transfers data to the input/output controller 168. Input/output controller 168 formats the data received from the smartcard 19 into the proper format to be placed on microprocessor bus 184. On the other hand, data to be provided to the smartcard 19 from the device is formatted by input/output controller 168 and passed to the smartcard 19 via smartcard interface 178.

Data entered by the user at keypad 212 (e.g., PIN or other code) is buffered and transferred to the input/output controller 168 via keypad/display controller 176, where it is then placed on the microprocessor bus 184 for system processing. Likewise, system messages (e.g., status) and/or user prompts are transferred through input/output controller 168 to keypad/display controller 176 and then to display 214 for display to the user. Further, input/output controller 168 also controls the operation of first and second indicators, 13 and 15, which as previously mentioned, give an indication to the user as to whether or not data transferred through device 10 is being encrypted. An appropriate instruction is passed to input/output controller 168 over the microprocessor bus 184 which instructs controller 168 to turn on the first indicator 13, which is preferably a red LED, when data is being transferred in a non-secure (i.e., non-encrypted) mode or to turn on the second indicator 15, which is preferably a green LED, when data is being transferred in a secure (i.e., encrypted) mode.

Figure 6:
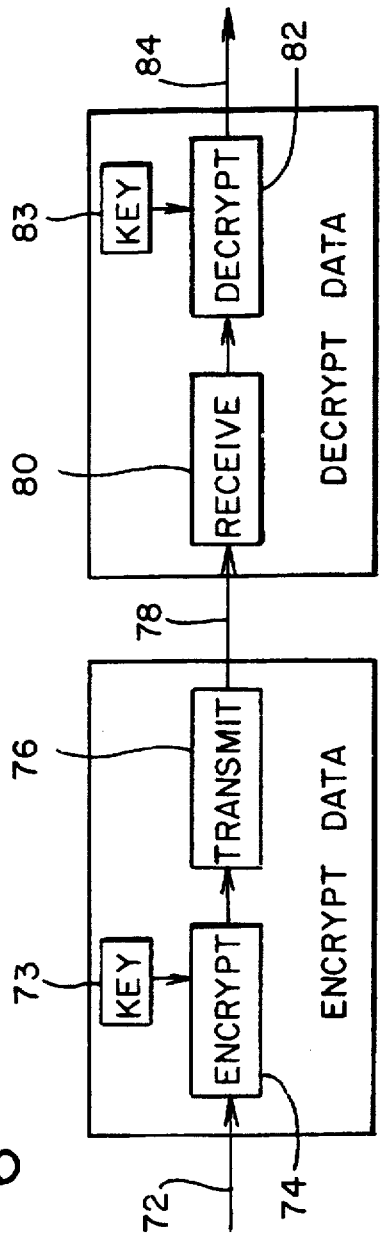
FIG. 6 is a block diagram which depicts data encryption and decryption in accordance with the present invention.

The operation of the device with respect to data encryption, device authentication, user authentication and message authentication will now be described. Specifically, FIG. 6 shows the encryption and decryption of communications data. Both the encrypt and decrypt functions are employed so that messages can be both sent and received. It is to be appreciated that the encrypt and decrypt functions may be performed under control of the microprocessor 164 (FIG. 2) by the crypto engine 170 and/or the smartcard 19 in an embodiment implementing a smartcard interface. Nonetheless, referring again to FIG. 6, plain text data 72 (i.e., non-encrypted data) is encrypted (Block 74) using one or more of a plurality of encryption algorithms well known to practitioners such as Feistel, U.S. Pat. No. 3,798,359 or Rivist, U.S. Pat. No. 4,405,829. The cryptographic algorithms used to perform these functions may be chosen from a variety of standard algorithms, usually in conformance with federal or national standards, and do not need to be described here in further detail. The choice of algorithm is unimportant to this invention. For example, encryption and decryption could be performed in accordance with American National Standard (ANS) X3.92, Data Encryption Standard, or by the Federal Information Processing Standard 185, Escrow Encryption Standard. The encrypted data is rendered unintelligible and therefore is kept confidential when it appears on the communications line 78. It should be understood that a communications line, such as line 78 depicted in FIG. 6, would be connected to connector port 14 of the present invention. The data is received (Block 80), possibly by another device formed in accordance with the present invention, and sent to a decryption function using a decryption algorithm (Block 82) which corresponds to the encryption algorithm described above and which recovers at output 84 the original plain text data 72.

Since many of the above-cited cryptographic algorithms are widely known, the algorithms operate with what are referred to in the cryptographic art as "keys." Keys are numeric data sets which may take on one of many values and, when combined with the otherwise publicly known algorithms, give the communications system its unique security identity. Systems may have both encryption and decryption keys. FIG. 6 illustrates an encrypt key 73 and a decrypt key 83. Depending on the application, the key may be "public", i.e., publicly known, or "private", i.e., not publicly known. The basic requirement is that the keys used by these standard algorithms for encryption and decryption must correspond and the modes of operation specified in these standards must be the same for encryption (Block 74) and decryption (Block 82).

It should be understood that there are essentially two types of algorithms: symmetrical key algorithms and public key algorithms. Symmetrical key algorithms are defined as algorithms where the encryption key may be calculated from the decryption key and vice versa. Therefore, both the encryption and decryption keys are kept secret, i.e., private keys. It is to be understood that in a symmetrical algorithm, a single key may function as both the encryption key and the decryption key. On the other hand, public key algorithms are defined as algorithms where the decryption key can not be calculated (at least not within a reasonable time period) from the encryption key. Thus, with respect to public key algorithms, one key is public while the other is private. Typically, the encryption key is public, thus allowing anyone with the public key to encrypt data, but the decryption key is private, thus allowing only those with the private key to decrypt the data. However, public key algorithms exist where data is encrypted using a private key and decrypted using a public key. This type of algorithm, as will be discussed later, is known as a digital signature algorithm since it essentially authenticates the person encrypting the data given the fact that such person would theoretically not be using the private key if he or she were not authorized to use it. The digital signature algorithm may also include timestamping whereby the date and time of the "signature" are attached (i.e., concatenated) to the message and "signed" along with the message.

Furthermore, a data manipulation function, known as a "hash" function, may operate as part of either a symmetrical algorithm or a public key algorithm to provide message authentication. The hash function receives an input data string and converts it to a fixed-size, typically smaller, output string. For instance, a very simple hash function would be one that takes an input string and returns a byte consisting of the exclusive-OR of all the input bytes. The output of the function is generally referred to as a message authentication code (MAC) or, more simply, a hash. The purpose of the hash function is to "fingerprint" the input data string in order to produce a value that indicates, to a reasonable degree of certainty, that a data string received by another user of the communications network is the same as the input string. Thus, hash functions are useful in the cryptographic art because the receiver of data, knowing the hash of the data originally transmitted by the sender, can be reasonably assured when he receives a data message with the particular hash, that the original message was not altered in transit. The hash should also preferably be encrypted to prevent tampering therewith.

Thus, in addition to encrypting the communicated data as described with respect to FIG. 6, the present invention permits the communicated data to be authenticated by the sender (e.g., user) and verified by the recipient. Accordingly, data (or message) authentication verifies that data has been received without modification and also verifies the identity of the sender. By way of example, such authentication may be performed by using the hash function and digital signature function discussed above.

Figure 7:
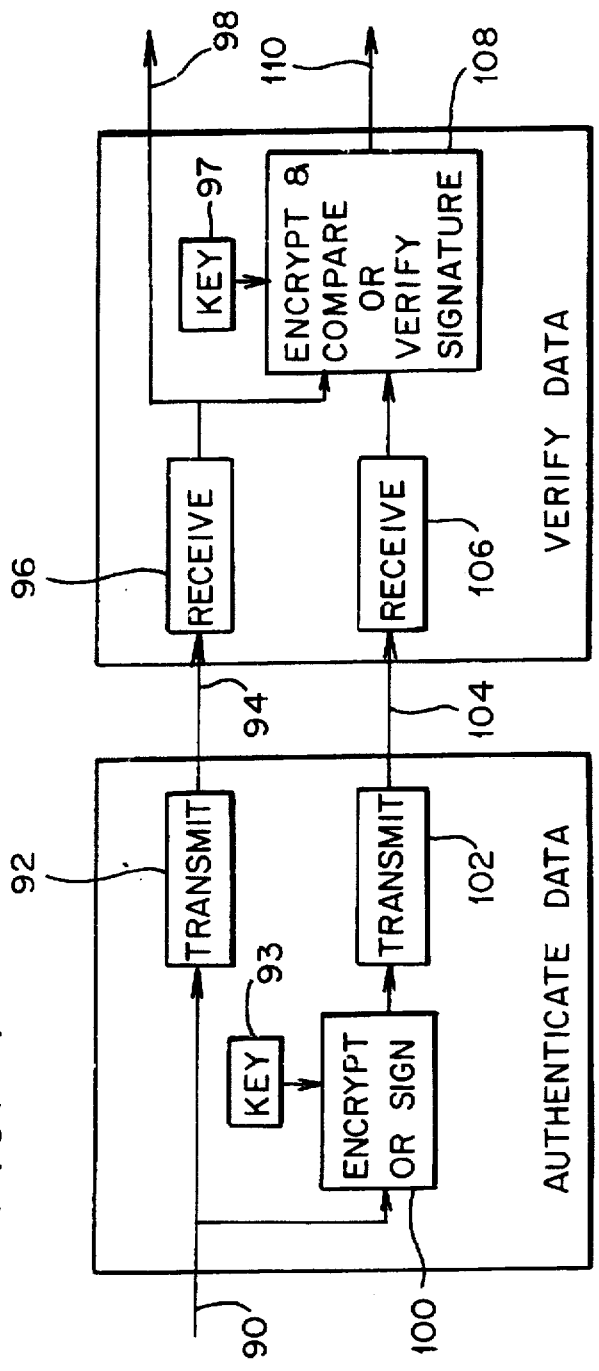
FIG. 7 is yet another block diagram which depicts authentication and verification in accordance with the present invention.

Referring now to FIG. 7, a functional block diagram of the above-mentioned authenticate and verify process is illustrated. Data 90 is transmitted (Block 92) by means of a communications line 94 to a recipient 98. Contemporaneously, the data may be authenticated (Block 100) by a plurality of authentication algorithms, such as those briefly discussed above for example, which are well known to the art and all of which may process messages and produce an authenticator number or digital signature which is transmitted with the data for use in verifying its source and accuracy. Examples of this process are described in detail in American National Standard X9.9, Message Authentication Standard, or American National Standard X9.30, Digital Signature Standard, or in numerous patents such as U.S. Pat. No. 4,995,082. The result of this authentication process is transmitted (Block 102) via communications line 104 where it is received (Block 106) by the recipient 98 who performs the verification process (Block 108) to determine if the data 90 has been modified before reception (Block 96). The verification process depends upon the algorithm chosen to implement the present invention. If the authentication was performed in accordance with American National Standard X9.9, for example, then the validation process consists of encrypting the data (Block 108) in accordance with the standard and in the same way as was done in block 100 and then comparing the resulting authentication codes with the authentication code which was received over line 104. If the message was modified in transit (between Block 92 and Block 96) or if the keys used to authenticate (i.e., key 93) and validate (i.e., key 97) differ, then with a high degree of probability, the authentication codes will also differ. If digital signatures are used for authentication, then the signing process (Block 100) and the verification process (Block 108) will use different algorithms which are specified in detail in the appropriate National or Federal standards.

In this particular case, the private key 93 used to sign the data and the public key 97 used to validate it form a set which will correctly validate the data. If a different private key is used to validate the data than the one in the set, then validation with the public key of the set will fail. Accordingly, with respect to this particular case where a private and public key are used, there is an unambiguous indication that the sender possesses the unique private key and is presumed to be the authorized sender. In any case, the result of the verification decision (Block 108) is provided to the recipient 98 to indicate whether or not the data is valid. This can simply be in the form of a message which describes the accompanying data as being valid or invalid.

Device authentication is performed in order to ensure that a user who wishes to obtain access to communications equipment possesses an authorized device. The authenticity of the device will be determined by the presence of a secret or private key either contained within the device itself or within a smartcard inserted into the device. The device, therefore, novelty serves as a "token" which must be employed to gain access to a network, computer or other protected communications facility. If the "token" is invalid, then access will be denied.

User authentication is performed to indicate to the challenger that the user of the device knows a personal identification number (PIN) or password which uniquely identifies the individual in possession of the device. This adds to the security of the system by ensuring that a stolen device, for example, cannot be used. In the present invention, the user authentication procedure is optional, and when this option is employed, it may preferably be combined with the device authentication process. However, user and device authentication may be respectively performed using different algorithms.

Figure 5A:
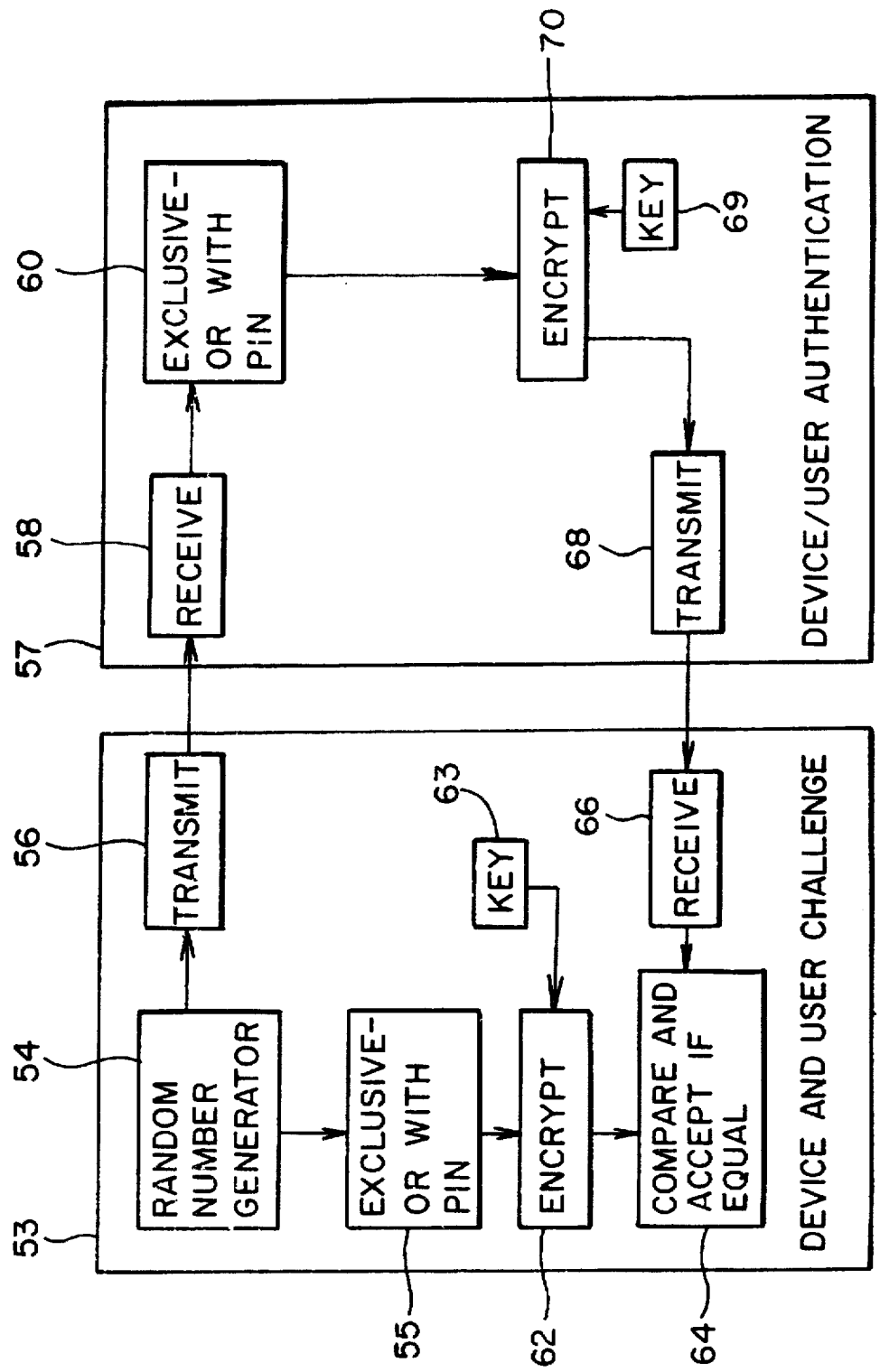
FIG. 5A is a block diagram which depicts both the device and user authentication in accordance with standard message authentication and in accordance with the present invention.

Referring now to FIG. 5A, a functional block diagram of an exemplary device/user authentication and challenge process which may be performed in accordance with the present invention is illustrated therein. The challenger's portion of the system, depicted as block 53 of FIG. 5A, is known in the art and can be purchased from several vendors to meet a number of National and Federal Standards as described above. When used with the user's portion, i.e. block 57, these components form a portion of the described embodiment of the present invention. The device authentication process is similar to that of message authentication (e.g., hash function), described above, except that a generator 54 generates a time-varying number, such as a random number (or a time and date), which is authenticated instead of the communications data. This number is sent (Block 56) to the recipient (Block 58) whose operator is optionally asked to enter a personal identification number (PIN) to uniquely identify the user. The PIN, when used, is added to the time-varying number modulo 2 (i.e., exclusive-OR function). The result is encrypted 70 under a unique key 69 assigned to the device. In another embodiment of the present invention, the user inserts a smartcard which contains the unique key and the processor (i.e., crypto engine) used to accomplish the encryption function of block 70.

The encrypted result is sent (Block 68) to the challenger and received at block 66. Contemporaneously, the time varying number generated by generator 54 and the user's PIN are added modulo 2 (i.e., exclusive-OR function) in block 55 and then encrypted in block 62 by the challenger under key 63 which, with respect to this particular embodiment, is the same key employed by the user. The result of block 62 is then compared with the encrypted item received (Block 66) from the user. If the two messages match, then the user is considered to be properly authenticated. If the user does not possess a device containing the correct key, if the PIN entered by the user is incorrect, if a previously recorded version of the time-varying number sent by block 56 is used in this transaction, or if a previously recorded version of the encrypted response sent by 70 is used in this transaction, then the comparison will fail. The result of this comparison may be used by the challenger to terminate the communications session and alert a security officer that an unauthorized device or person is attempting to access the challenger's equipment. It is to be appreciated that such device/user authentication and challenge process, as described above with respect to FIG. 5A, is an example of the implementation of a symmetrical key algorithm where both keys, 63 and 69, are the same. It is also to be understood that a serial number associated with the device and a sequence number which increases for each communications session may be used in place of the random or time-varying number for authentication purposes.

Digital signatures, as previously mentioned, are a form of authentication which differs from the symmetrical key technology described above in that the signer has a unique private key and the verification process uses a companion public key which can be used to verify the signature as valid. This provides an additional property that the signer is the only holder of the private key and can, therefore, not repudiate having performed a verified signature. In this preferred embodiment, the device and user authentication procedure can also be accomplished using one of a plurality of digital signature algorithms well known to the art, such as American National Standard (ANS) X9.30, Digital Signature Standard and Secure Hash Algorithm, or ANS X9.31 Digital Signature Algorithm.

Figure 5B:
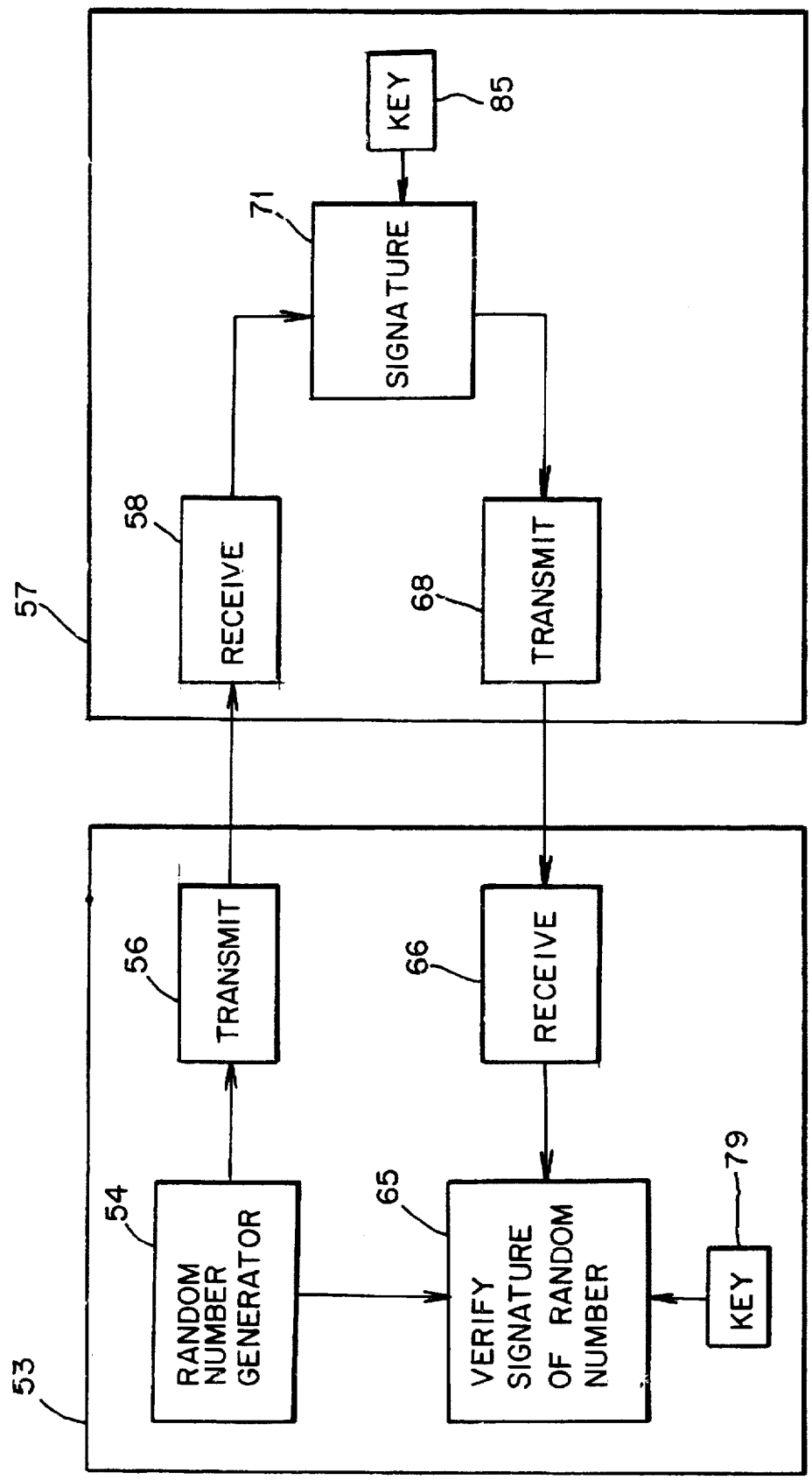
FIG. 5B is a block diagram which depicts device and user authentication in conjunction with digital signatures and in accordance with the present invention.

Referring now to FIG. 5B, a functional block diagram of an example of such a process for device and user authentication is illustrated. In this case, the challenger's portion 53 of the system contains a similar random number generator 54 as illustrated in FIG. 5A. The generator 54 generates a time-varying number, i.e., random number, which is sent (Block 56) to the user's portion 57 of the system where it is received (Block 58). The random number is then signed (Block 71) via the use of a digital signature algorithm and the user's private key 85 and then sent back (Block 68) to the challenger portion 53. Contemporaneously in the challenger portion 53, the random number is signed using the same digital signature algorithm employed by the user; however in this case, the random number is signed using the public key 79. The public key 79 may be used in this verification because of the fact that, in public key algorithms, the public key is mathematically related to the private key (i.e., forming a mathematically related key pair); however, the private key theoretically can not be deduced from the public key. It is to be appreciated that the signature performed by the user (Block 71) will not match the signature performed by the challenger (Block 65) if the random number was not signed by the user with the private key 85. Therefore, the verification of the random number will fail if the user does not have the proper private key (key 85) which mathematically relates to the challenger's public key (key 79). Accordingly, the result of the verification process (Block 65), like the comparison test (Block 64 in FIG. 5A), is a simple pass or fail.

Also, it should be appreciated that in a device employing a smartcard interface, the signature by the user may be performed by the smartcard which the user inserts into the device. In such a configuration, the smartcard would contain the private key and the user's PIN in order that the user would be properly authenticated. However, in an embodiment including a keypad, the user may be prompted to manually enter his or her PIN which would serve to unlock the private key in order that the key may be used with the signature function. Such an approach adds an extra level of security given the fact that one who is not unauthorized to be on the communications network, but who possesses the smartcard, would still not gain access unless he or she also knew the user's PIN.

It should be understood that the compact encrypting/authenticating communications device of the present invention may perform either the user function or the challenger function described above and that the user/challenger communications described above may be had between two separate devices formed in accordance with the present invention. Also, it should be appreciated that the national standards described in the previously described embodiments are examples of common algorithms known to the art and are not the only means of performing the encryption or authentication functions of the present invention. Moreover, analog and/or digital circuitry can be used to implement the various elements and perform the functions of the present invention described herein.

Figure 3:
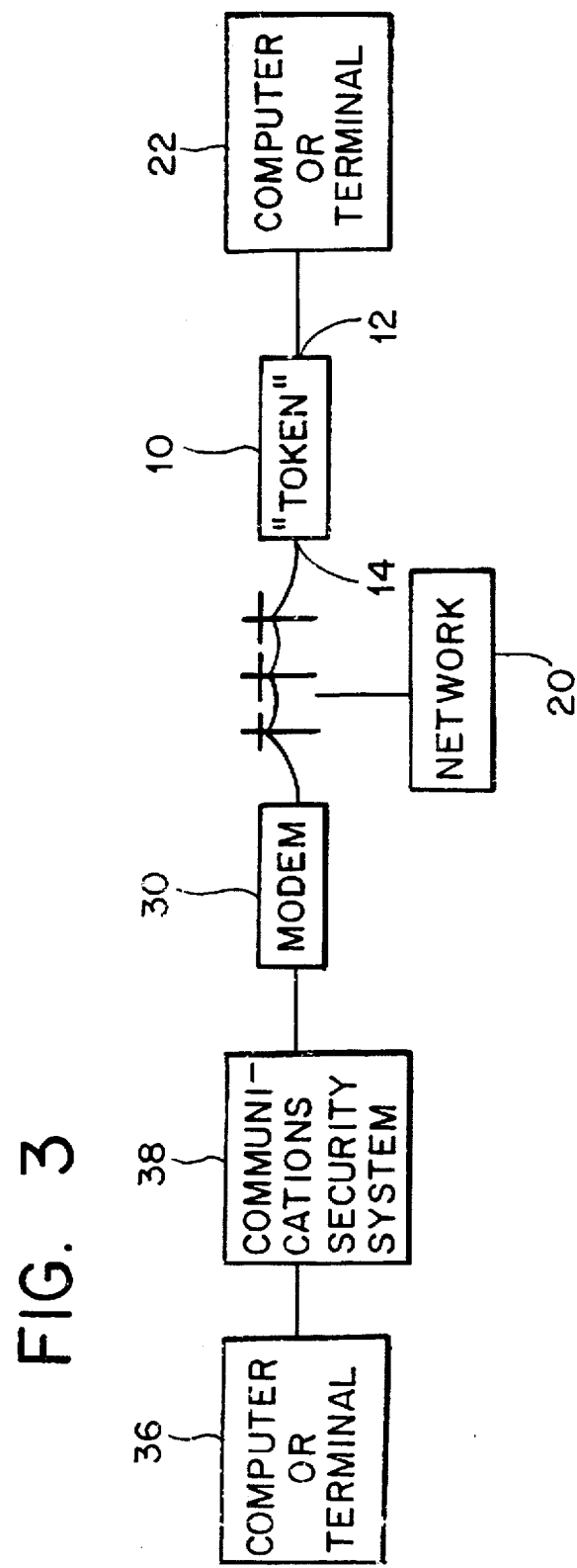
FIG. 3 is a block diagram showing the connection and use of the present invention in a computer network.

Referring now to FIG. 3, a block diagram of the interconnection of device 10 of the present invention to a communications network is depicted. The two connector ports, 12 and 14, of the encrypting/authenticating communications device 10 are respectively connected to a computer or terminal 22 and to a network 20. It is to be appreciated that such interconnection permits two basic modes of operation: (a) in-line communications in which data transmitted from an authenticated user at the computer 22 is passed through the device 10 in a single pass and sent, in encrypted form, to the network 20 through the modem or particular network interface that forms a part of device 10; and (b) off-line communications in which data to be transmitted from the computer 22 is sent to the device 10 and, after authentication and encryption has been performed, is returned to the user's application program running on the computer 22 for subsequent transmission to the network 20, possibly as part of another message. A set of codes or signals are issued by the user or user's computer to instruct the encrypting/authenticating communications device to switch between these operating modes. It is to be appreciated that, in one embodiment of the present invention employing a keypad, the user may perform mode selection via entry of a code at the keypad. Alternatively, it is to be appreciated that data received from the network 20 by the device 10 is processed in the reverse order from the order described above with respect to data transmitted from the device 10 to the network 20.

In FIG. 3, the device 10 of the present invention is connected to a network 20 which may contain other equipment, such as a collection of commercially available communications security components which are built to compatible standards and which provide data encryption, device authentication, user authentication and message authentication services as defined herein. Such equipment, for the sake of simplicity, is collectively illustrated in FIG. 3 as communications security system 38. Data transmitted over the network is received by modem 30 and authenticated and/or decrypted by the separate components of the communications security system 38 and then transferred to computer 36. However, it is to be appreciated that the communications security system 38, with all its individual encryption and authenticating equipment, and modem 30 may be advantageously replaced with a single portable and compact encrypting/authenticating communications device formed in accordance with the present invention. Thereby, computer 36 and computer 22 may securely communicate with each other over network 20, each employing a single device 10 having the novel features of the present invention described herein. Also, it should be understood that any number of computers may operate over the network 20 and may advantageously employ an encrypting/authenticating communications device 10.

Figure 4A:
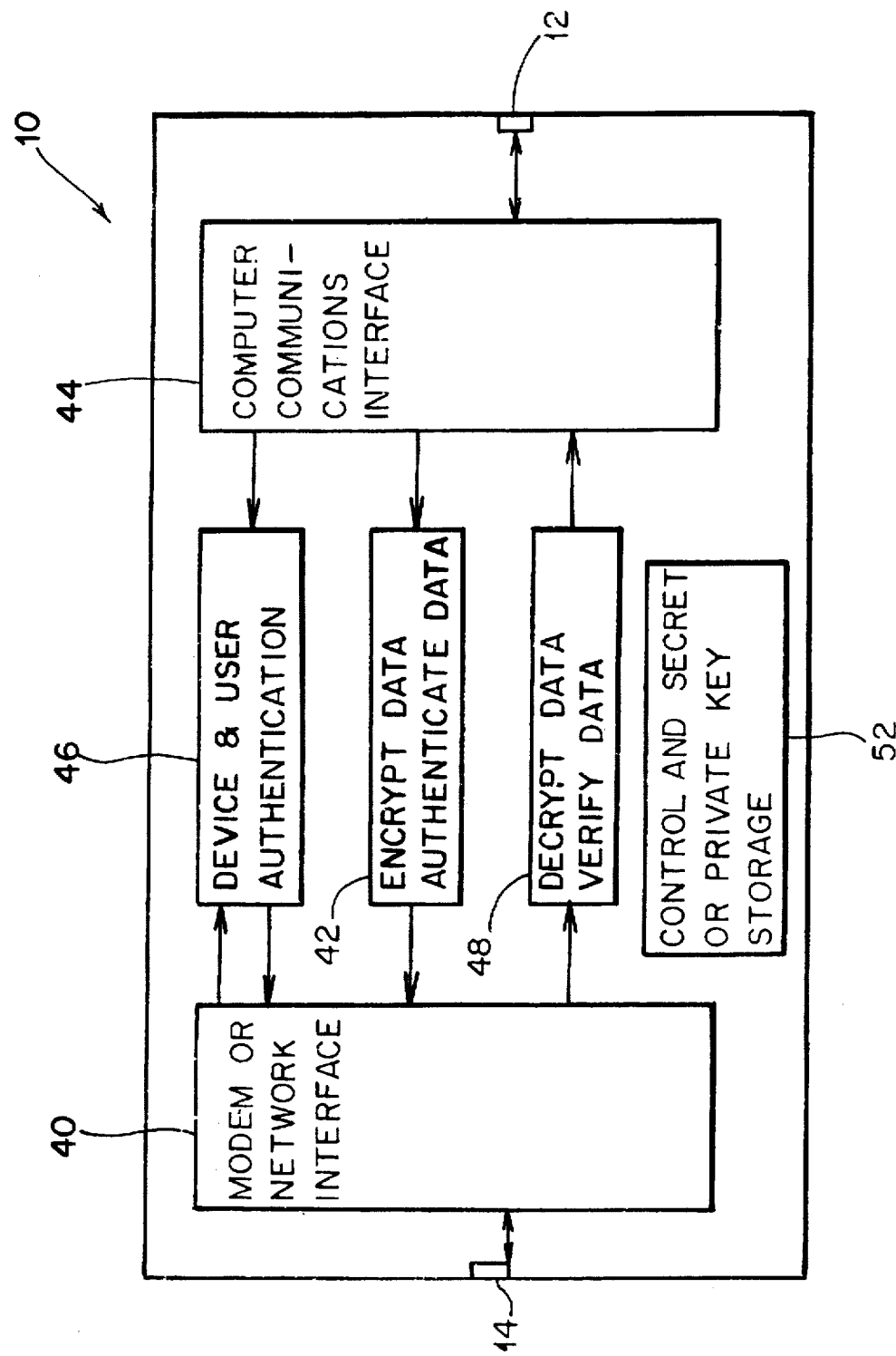
FIG. 4A is a diagram of the flow of data within the encrypting and authenticating device of the present invention, which shows the processing sequence for in-line mode of encryption and authentication.

Referring now to FIG. 4A, a block diagram of in-line mode data flow through the encrypting/authenticating communications device 10 connected between the network 20 and the computer 22 shown in FIG. 3 is illustrated. At the beginning of a session, initiated either by the user or detected by the presence of a carrier at the modem or network interface 40, a device authentication procedure is performed and, optionally, a user authentication procedure may also be performed. Such authentication procedures may employ one of the exemplary processes described herein. If the authentication procedure fails, then the program will not enable the call and the modem will disconnect (hang up the call). If all authentication procedures succeed, then the carrier detect line is raised at the interface (i.e., connector port 12) to the user's computer or terminal, enabling the call. No data will be transmitted until the call is enabled in this way.

As previously described in detail and exemplified in FIGS. 5A and 5B, device and user authentication may be performed between the device 10 of the present invention and another security system (e.g., system 38 in FIG. 3) or a similar device 10 connected to the communications network. Also as previously mentioned, the authentication algorithm can be any known to the art, such as ANS X9.9 message authentication code, ANS X9.30 digital signature algorithm (DSA) or ANS X9.31 digital signature algorithm (RSA). It should be understood that system 38 and device 10 may alternately operate as challenger and user in relation to the authentication procedures illustrated in FIGS. 5A and 5B.

Referring again to FIG. 4A, once authentication (Block 46) has been successfully completed so that the identities of the device and, optionally, the user have been established, then data encryption (Block 42) and decryption (Block 48) will be allowed to begin. The present invention preferably does not permit any of the user's data to pass before authentication is successfully consummated and only passes items such as authentication codes and automatic key management messages required to securely establish the call. Data may be transmitted by the user's computer or terminal and received at the communications interface 44 of the encrypting/authenticating communications device 10 via connector port 12. The data is encrypted (Block 42) and, if required, authenticated (e.g., message authentication process such as a hash function) and then passed to a modem or network interface 40 for transmission on a communications line (e.g., telephone line) connected at connector 14. It is to be understood that the type of network interface 40 which may be employed by the present invention depends upon the type of network to which the device is coupled. Therefore, as previously explained, the network interface employed by the device may be, for example, an ISDN interface (i.e., ISDN compatible modem), a LAN interface, or any other interface known to those skilled in the art. Alternately, data received from the line at the modem 40 will be decrypted (Block 48) and, if required, verified (e.g., checking message authentication code) and then sent to the communications interface 44, then to the connector port 12, and on to the communications port of the user's computer or modem. Control and secret or private key storage 52 is where the secret key used for encrypting and authenticating functions may be stored and where key management may be controlled. Storage 52 may be performed by smartcard 19 or crypto engine 170 illustrated in FIG. 2.

Figure 4B:
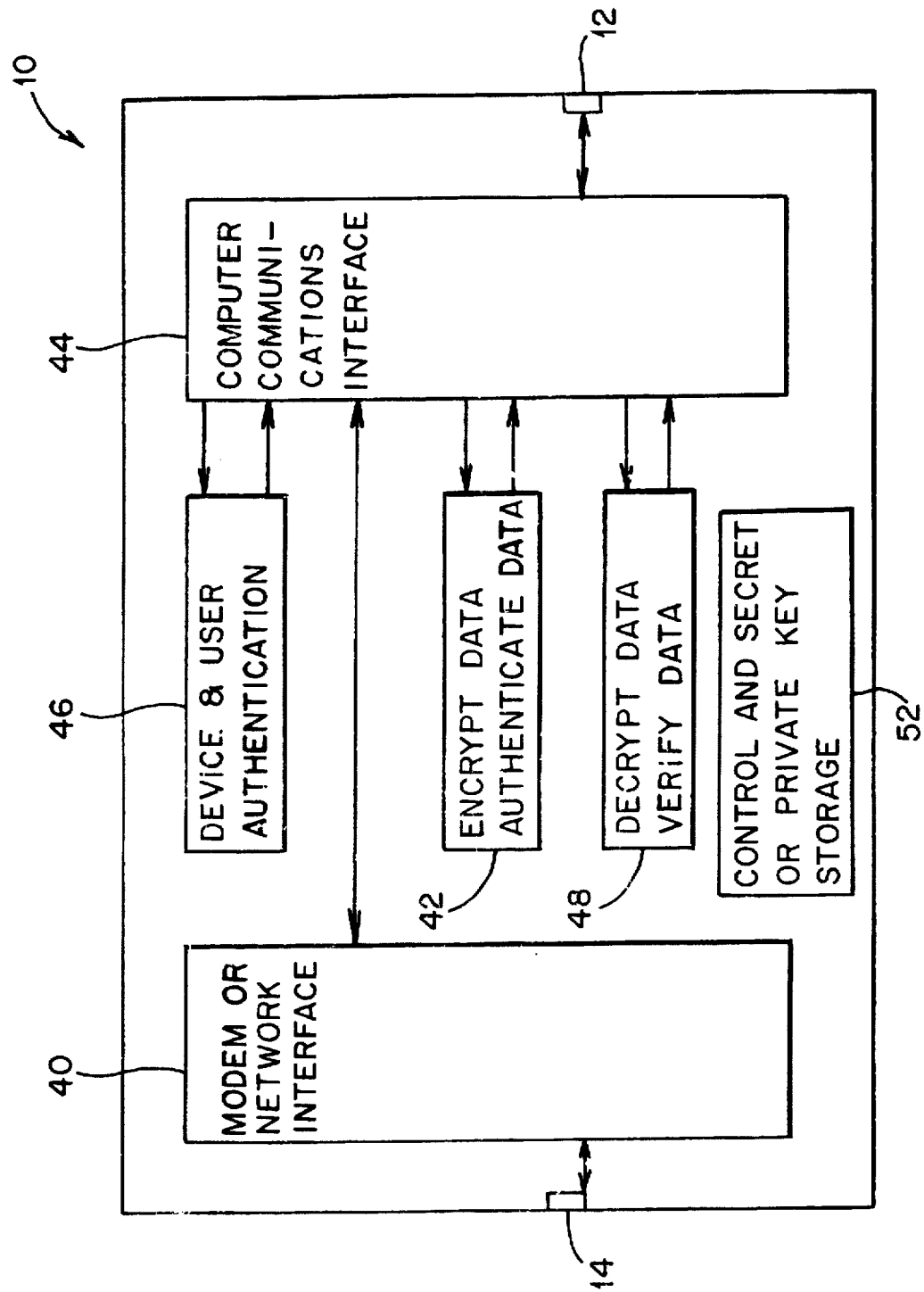
FIG. 4B is a diagram of the flow of data within the encrypting and authenticating device of the present invention which shows the processing sequence for off-line mode of encryption and authentication.

Referring to FIG. 4B, a block diagram of off-line mode data flow in the encrypting/authenticating communications device is illustrated. Specifically, the flow of data through the encrypting/authenticating communications device 10 in the off-line mode of operation is the same as that described above for the in-line mode except that the encrypted data of block 42 is returned to the user's computer or terminal by means of the interface 44 for storage or subsequent transmission by the user. If subsequently transmitted, the data from connector 12 to interface 44 is sent directly to the modem or network interface 40 for transmission on the telephone line, bypassing encryption. In the off-line mode, data received at the modem or network interface 40 bypasses decryption and is sent by the interface 44 directly to the user's computer. The user can subsequently decrypt the data by passing the data through the interface 44 to the decryption block 48 for return to the user by means of the interface 44.

Figure 8:
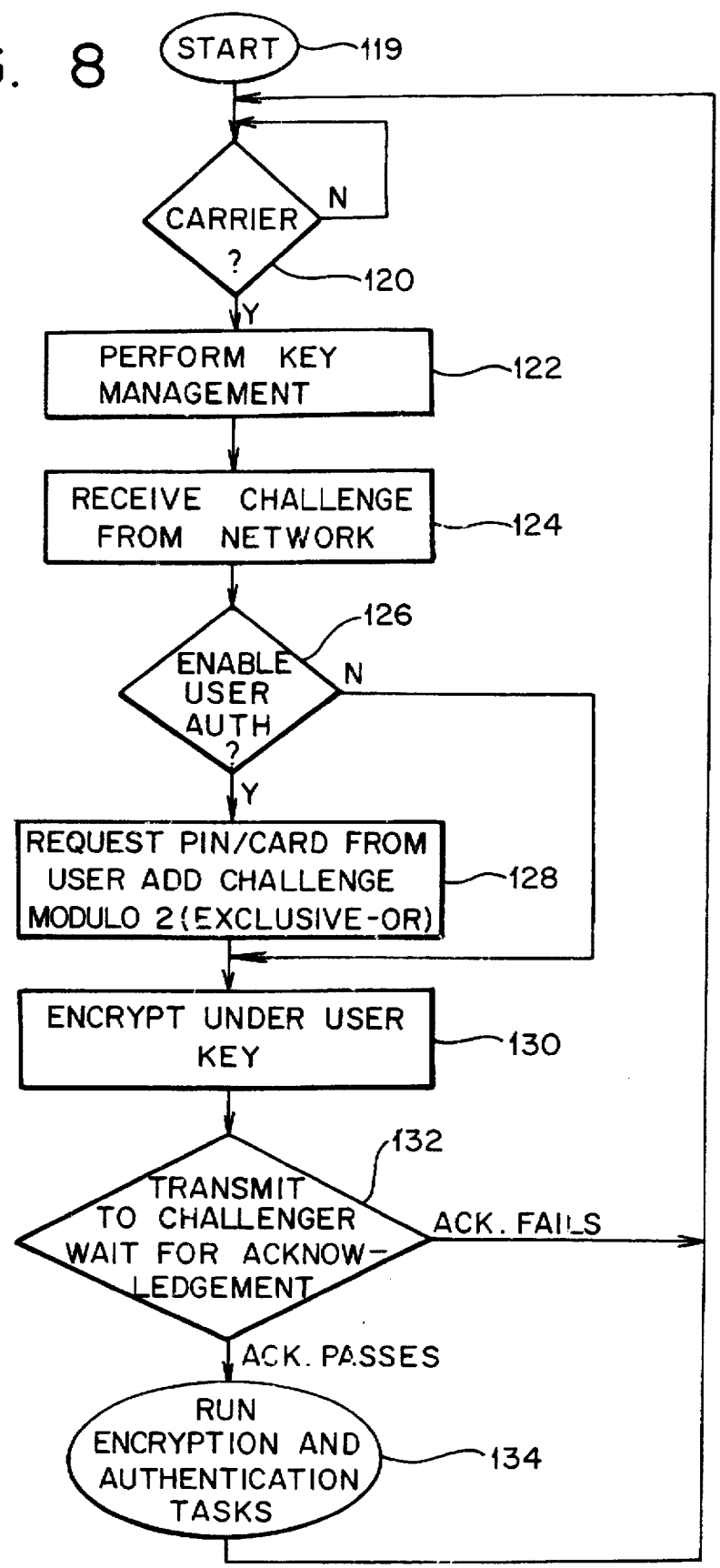
FIG. 8 is a flow diagram which describes the process for call establishment in accordance with the present invention.

Referring now to FIG. 8, it is to be appreciated that, with respect to the present invention, the internal modem, or other type of communications network interface employed, initiates calls when the user issues an industry-compatible modem command to begin dialing. This command is passed directly to the modem as long as no carrier is present on the line. Incoming calls begin with the appearance of a carrier on the communications media which causes the modem to raise a carrier detect signal to the microprocessor of the device (see block 164 of FIG. 2). In either event, the modem acquires carrier 120 (see FIG. 8) and performs any key establishment which must be performed to initiate a call (Block 122). This process can simply be the manual loading of a key into the memory of the pocket encrypting/ authenticating communications device or it could provide for automatic key changes. The selection of a method of key entry and management is not important to the description of the present invention as several national standards exist for the management of cryptographic keys, such as American National Standard X9.17. The device then waits for a challenge from the network or other security device (Block 124). Any security device which meets American National Standard X9.26, for example, will function like block 53 in FIG. 5A or 5B and supply this random or time-varying challenge.

When the challenge is received (Block 124) and the device is configured to require user authentication (Block 126), then the user is prompted for a PIN or smartcard insertion (Block 128). The PIN, or other identifying number is added to the challenge modulo two (Block 128), an arithmetic operation which is also known as the logical exclusive-or. This ensures that the result will not match if the PIN is incorrect. The challenge is then encrypted in order to both hide the PIN and provide proof to the challenger that the device possesses the correct encryption key (Block 130). The encrypted result is returned to the challenger to be checked as described previously (Block 132). If the verification process is not successful (ACK. FAILS), then the challenger hangs up the call or otherwise ends the communication session. If it is successful (ACK. PASSES), then an acknowledgment, defined in the user authentication standards, is returned to the device and communications are enabled by the challenger so the network or computer is accessible. Data encryption and message authentication tasks can then be run (Block 134).

Figure 9:
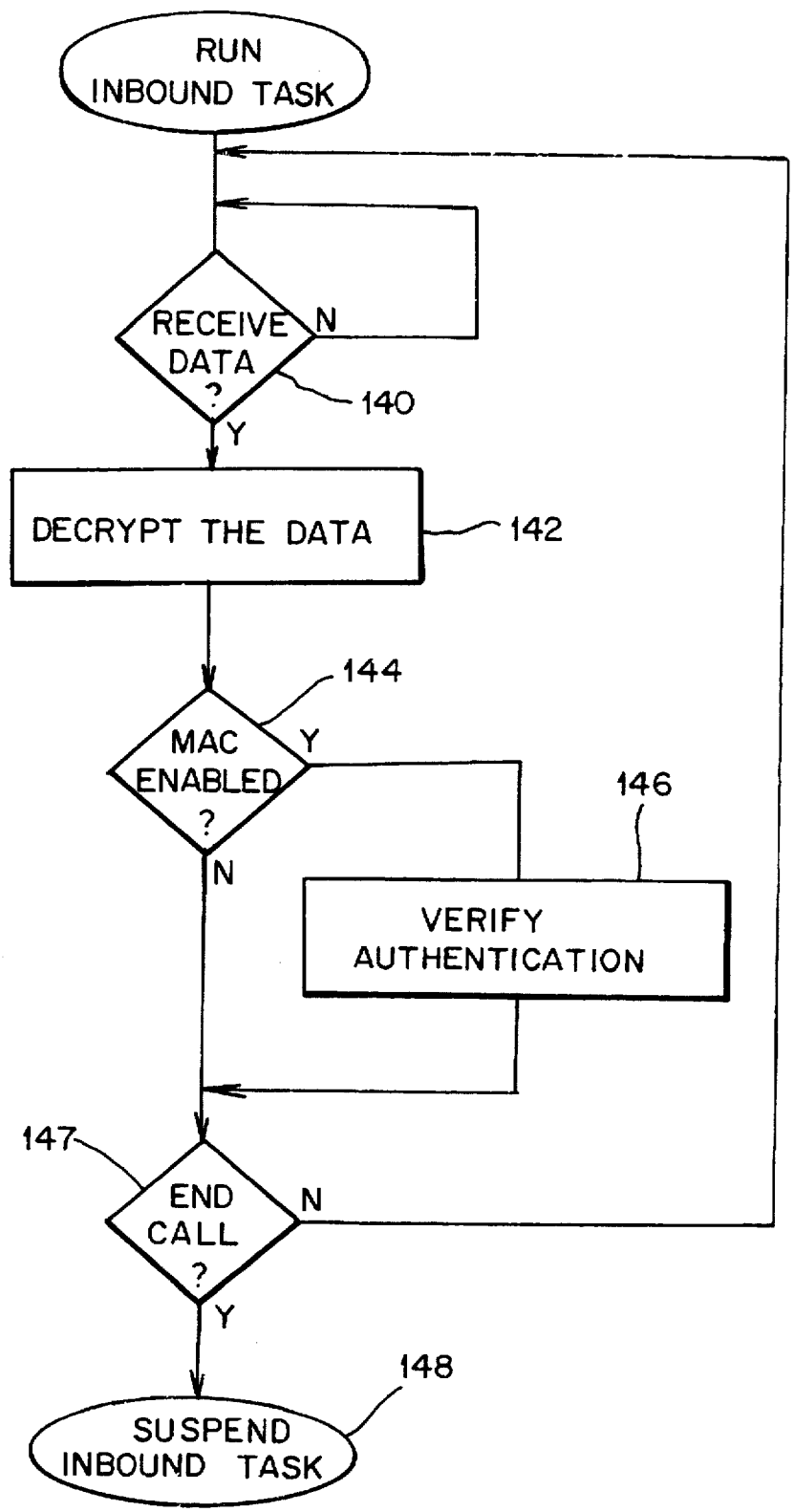
FIG. 9 is a flow diagram which indicates the protocol for processing an inbound task in accordance with the present invention.

After the user has been successfully authenticated as described in the prior paragraph, two concurrent tasks begin to operate, the Inbound Task (see FIG. 9), which processes data from the network, and the Outbound Task (see FIG. 10), which processes data to the network. Referring to FIG. 9, the Inbound Task receives data (Block 140) through the modem or network interface 40, decrypts (Block 142) the data received and then verifies (Block 146) the data if the message authentication code (MAC) option is enabled (Block 144). When the call ends and carrier drops (Block 147), the task is suspended (Block 148).

Figure 10:
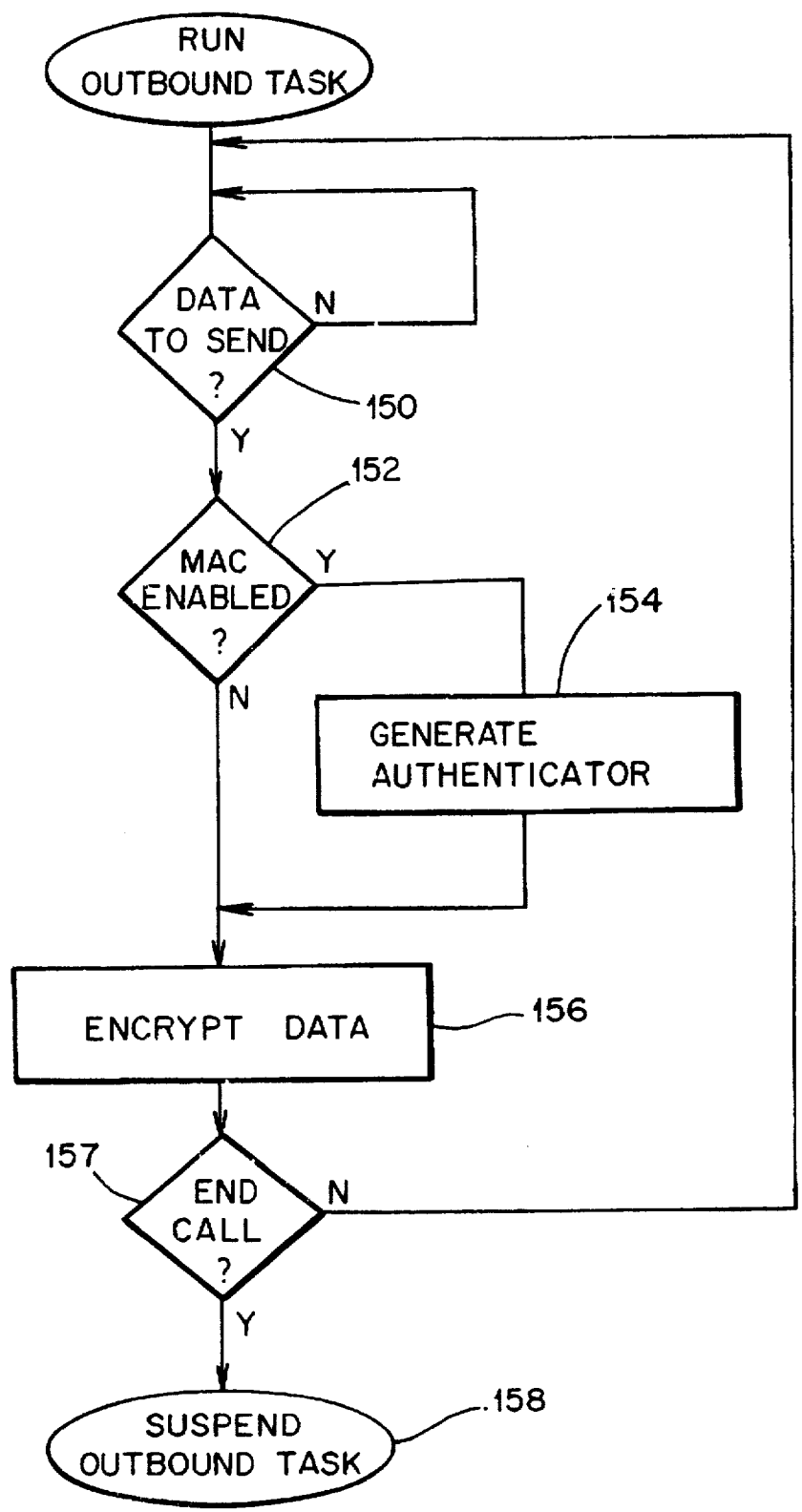
FIG. 10 is a flow diagram depicting the protocol for processing an outbound task in accordance with the present invention.

The Outbound Task, as illustrated in FIG. 10, simply reverses the order of processing. When data is received from computer 22 to be sent (Block 150) to the modem or network interface 40, it is first subjected to message authentication (Block 152) as previously described, if that feature is enabled. The data is then encrypted (Block 156) in a loop which continues until the end of the call (Block 157) at which time the Outbound Task will be suspended (Block 158).

Thus, while there have been described what are currently believed to be the preferred embodiments of the present invention, those skilled in the art will realize that other and further modification and changes may be made thereto without departing from the true spirit of the invention, and it is intended to claim all such changes and modifications as come within the scope as set forth in the appended claims.

What is claimed is:

1. An encrypting and authenticating communications device for establishing a secure communications link for data exchanged over a communications network between one of a plurality of remote computing systems and a computing system of a user, the device comprising:

computer processing means, the computer processing means controlling establishment of the secure communications link;

encrypting means, the encrypting means being electrically interconnected with the computer processing means, the encrypting means encrypting data transmitted from the computing system of the user to one of the plurality of remote computing systems and decrypting data received from one of the plurality of remote computing systems by the computing system of the user;

authenticating means, the authenticating means being electrically interconnected with the computer processing means, the authenticating means authenticating to one of the plurality of remote computing systems that the device is authorized;

network interfacing means, the network interfacing means being electrically interconnected with the computer processing means, the network interfacing means establishing a data interface compatible with the communications network for allowing the device to transmit and receive data over the communications network; and a compact housing, the housing containing the computer processing means, the encrypting means, the authenticating means and the network interfacing means therein, the housing having electrical interconnection means for establishing electrical interconnection of the device with the communications network and the computing system of the user.

2. A device as defined in claim 1, wherein the authenticating means further includes means for authenticating the user to one of the plurality of remote computing systems.

3. A device as defined in claim 2, further comprising data entry means, the data entry means being electrically interconnected with the computer processing means, the data entry means permitting the user to enter an identification indicator to the device, the user authentication means being electrically interconnected with the identification indicator and correspondingly authorizing the user to one of the remote computer systems therewith.

4. A device as defined in claim 3, wherein the data entry means includes a keypad whereby the user manually enters the identification indicator therewith.

5. A device as defined in claim 4, wherein the keypad is integrally mounted on the compact housing of the device.

6. A device as defined in claim 3, wherein the data entry means includes a smartcard and smartcard interface and the housing of the device includes a smartcard receptacle whereby the user inserts the smartcard into the smartcard receptacle and the identification indicator is automatically read from the smartcard and presented to the device via the smartcard interface which is operatively coupled to the computer processing means.

7. A device as defined in claim 3, further comprising display means, the display means being operatively coupled to the computer processing means, the display means prompting the user to enter the user identification indicator via the data entry means.

8. A device as defined in claim 7, wherein the display means includes a liquid crystal matrix display.

9. A device as defined in claim 8, wherein the liquid crystal matrix display is integrally mounted on the compact housing of the device.

10. A device as defined in claim 1, wherein the authenticating means further includes means for respectively authenticating and verifying the integrity of data transmitted and received over the communications network.

11. A device as defined in claim 1, wherein the communications network is an integrated services digital network (ISDN) and the network interfacing means establishes an ISDN compatible data interface for data transmitted and received over the communications network.

12. A device as defined in claim 1, wherein the communications network is a local area network (LAN) and the network interfacing means establishes a LAN compatible data interface for data transmitted and received over the communications network.

13. A device as defined in claim 1, wherein the encrypting means and the authenticating means further include a smartcard and smartcard interface and the housing of the device includes a smartcard receptacle, whereby the smartcard interface is electrically interconnected with the computer processing means and the smartcard is inserted into the smartcard receptacle, the smartcard containing one of a plurality of encryption and authentication algorithms and performing the encryption and authentication functions in operative cooperation with the computer processing means.

14. A device as defined in claim 1, wherein the electrical interconnection means includes at least first and second connectors, the first connector being electrically interconnected with the communications network and the second connector being electrically interconnected with the computer system of the user.

15. A device as defined in claim 14, wherein the second connector is a PCMCIA connector which is electrically interconnected with a compatible PCMCIA connector associated with the computer system of the user.

16. A device as defined in claim 15, wherein the compact housing of the device is formed to have a thin, rectangular shape for insertion into a PCMCIA receptacle associated with the computer system of the user.

17. A device as defined in claim 1, further comprising at least first and second indicators, the first and second indicators being electrically interconnected with the computer processing means and indicating status of operation of the device.

18. A device as defined in claim 17, wherein the first indicator is a red LED which indicates, when illuminated, that the data passing through the device is not being encrypted by the encrypting means.

19. A device as defined in claim 17, wherein the second indicator is a green LED which indicates, when illuminated, that the data passing through the device is being encrypted by the encrypting means.

20. A device as defined in claim 1, wherein the electrical interconnection means includes at least one pendant connector coupled to the device through a cable and the housing further includes a slot formed in at least one side of the housing, the slot being formed to include opposing sides, at least one of the opposing sides including a plurality of projections, the cable being folded into the slot and being held in the slot by the plurality of projections when the device is not in use.

21. A device as defined in claim 1, wherein the computer processing means selectively permits device operation in one of an in-line mode and an off-line mode, the in-line mode of operation permitting the data from the computer system of the user, once encrypted via the encrypting means, to be transferred to the network interfacing means for transmission on the communications network and the in-line mode of operation also permitting the data from one of the plurality of remote computer systems, once decrypted via the encrypting means, to be transferred to the computer system of the user, the off-line mode permitting the data from the computer system of the user, once encrypted via the encrypting means, to be returned to the computer system of the user for storage and subsequent transmission over the communications network and the off-line mode of operation also permitting the data from one of the plurality of remote computer systems to be transferred directly to the computer system of the user for storage and subsequent decrypting via the encrypting means.

22. An encrypting and authenticating communications device for establishing a secure communications link for data exchanged over a communications network between one of a plurality of remote computing systems and a computing system of a user, the device comprising:

first and second connector ports, the first connector port being electrically interconnected with the communications network and the second connector port being electrically interconnected with the computing system of the user;

a smartcard receptacle for accepting a smartcard;

first and second indicators;

a cryptographic module, the cryptographic module performing at least one of an encryption and authentication function and including a microprocessor, a system memory, an input/output controller, a crypto engine and a communications controller, all being electrically interconnected via a microprocessor bus; and an interface module, the interface module performing system interfacing functions and including a network interface, a smartcard interface and a communications port interface, the network interface being electrically interconnected with the first connector and the communications controller, the smartcard interface being electrically interconnected with the smartcard receptacle and to the input/output controller, the first and second indicators being respectively electrically interconnected with the input/output controller and the communications port interface being electrically interconnected with the second connector and the communications controller;

transmit data from the computer system of the user entering the device through the second connector and being buffered and transferred by the communications port interface to the communications controller, the communications controller formatting and placing the transmit data on the microprocessor bus, the microprocessor, in conjunction with the system memory and in response to the transmit data being placed on the microprocessor bus, causing the transmit data to be transferred to the crypto engine, the crypto engine performing at least one of encrypting and authenticating the transmit data, the smartcard sending a user identification code to the crypto engine via the smartcard interface and the input/output controller for performing the authenticating function, the microprocessor then transferring the transmit data back to the communications controller, the communications controller reformatting and sending the transmit data to the network interface, the network interface modulating the transmit data for transmission onto the communications network via the first connector;

receive data received from one of the plurality of remote computer systems over the communications network entering the device through the first connector, the network interface demodulating the receive data for manipulation by the device in response to entry of the receive data, the network interface transferring the receive data to the communications controller, the communications controller formatting the receive data and placing the receive data on the microprocessor bus, the microprocessor, in conjunction with the system memory and in response to the receive data being placed on the microprocessor bus, causing the receive data to be transferred to the crypto engine, the crypto engine performing at least one of decrypting and validating the receive data, the microprocessor then transferring the receive data back to the communications controller, the communications controller reformatting and providing the receive data to the communications port interface, the communications port interface converting the transmit data for transmission to the computer system of the user via the second connector;

the first and second indicators being electrically interconnected with the microprocessor via the input/output controller and providing device status indications to the user.

* * * * *